(12) United States Patent
Emmerich et al.

(10) Patent No.: US 8,256,396 B2
(45) Date of Patent: Sep. 4, 2012

(54) POWER CUTTER WITH CONTROLLER RESPONSIVE TO LUBRICATION STATUS

(75) Inventors: Wolfgang Emmerich, Sindelfingen (DE); Willi Strauss, Schoenaich (DE)

(73) Assignee: Black & Decker Inc., Newark, DE (US)

( * ) Notice: Subject to any disclaimer, the term of this patent is extended or adjusted under 35 U.S.C. 154(b) by 357 days.

(21) Appl. No.: 12/451,873

(22) PCT Filed: Jul. 4, 2008

(86) PCT No.: PCT/EP2008/058719
§ 371 (c)(1),
(2), (4) Date: Feb. 22, 2010

(87) PCT Pub. No.: WO2009/004088
PCT Pub. Date: Jan. 8, 2009

(65) Prior Publication Data
US 2010/0146798 A1    Jun. 17, 2010

(51) Int. Cl.
*F01M 11/10* (2006.01)
*F02B 77/08* (2006.01)
(52) U.S. Cl. .............. 123/196 S; 123/196 R; 123/198 D
(58) Field of Classification Search .............. 123/196 R, 123/196 S, 73 AD, 198 D; 184/108
See application file for complete search history.

(56) References Cited

FOREIGN PATENT DOCUMENTS

| GB | 2232913 A | 1/1991 |
|---|---|---|
| WO | WO 2005/056225 A1 | 6/2005 |

*Primary Examiner* — Noah Kamen
(74) *Attorney, Agent, or Firm* — Rhonda L. Barton; Adan Ayala

(57) ABSTRACT

A power cutter including a housing; a two stroke internal combustion engine mounted within the housing; a throttle switch by which the engine can be accelerated when the engine is running; a support arm mounted on the housing and which projects forward of the housing. A blade mounting mechanism is rotatably mounted on the end of the support arm and is capable of being rotationally driven by the engine when the engine is running. A carburetor provides aerated fuel for the engine and an air intake provides air for the carburetor. An air filtration mechanism filters the air drawn in from the air intake for the carburetor. A fuel tank provides fuel to the carburetor. An exhaust is provided through which the exhaust gases generated by the operation of the engine are expelled from the engine. The power cutter also includes an engine controller that controls the operation of the engine; an oil tank that provides lubricating oil for the engine; an oil pump that pumps lubricating oil from the oil tank to mix it with fuel; and a sensing system that determines whether sufficient lubricating oil is being provided for mixing with the fuel in accordance with predetermined parameters. The sensing system provides an indication to the engine controller of when the lubricating oil is not being provided in accordance with the predetermined parameters. When the sensing system indicates that the lubricating oil is not being provided in accordance with the predetermined parameters, the engine controller places the engine either in an idle mode or switches it off.

20 Claims, 35 Drawing Sheets

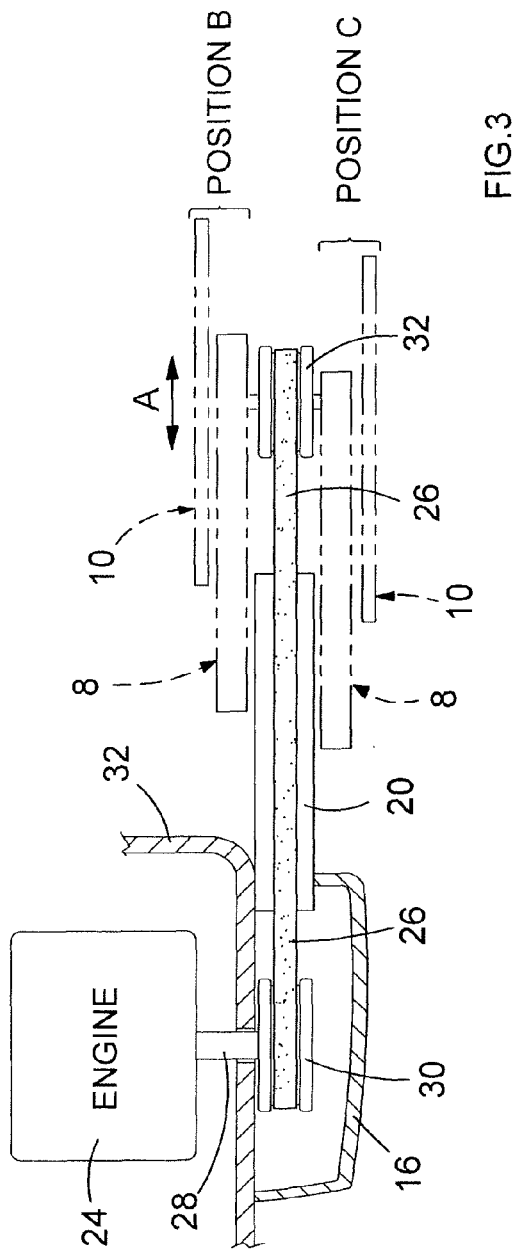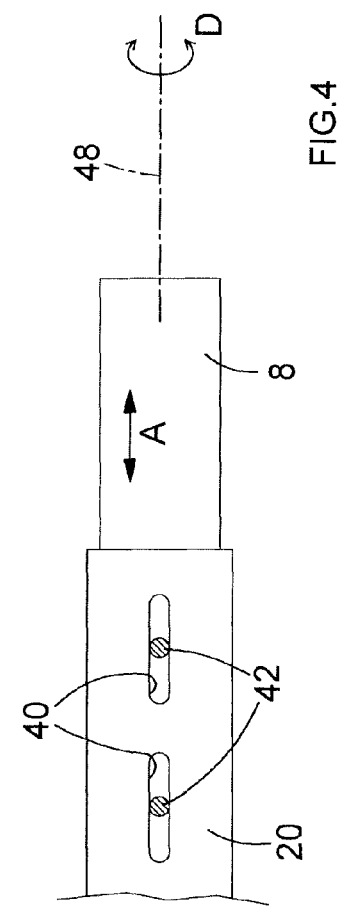

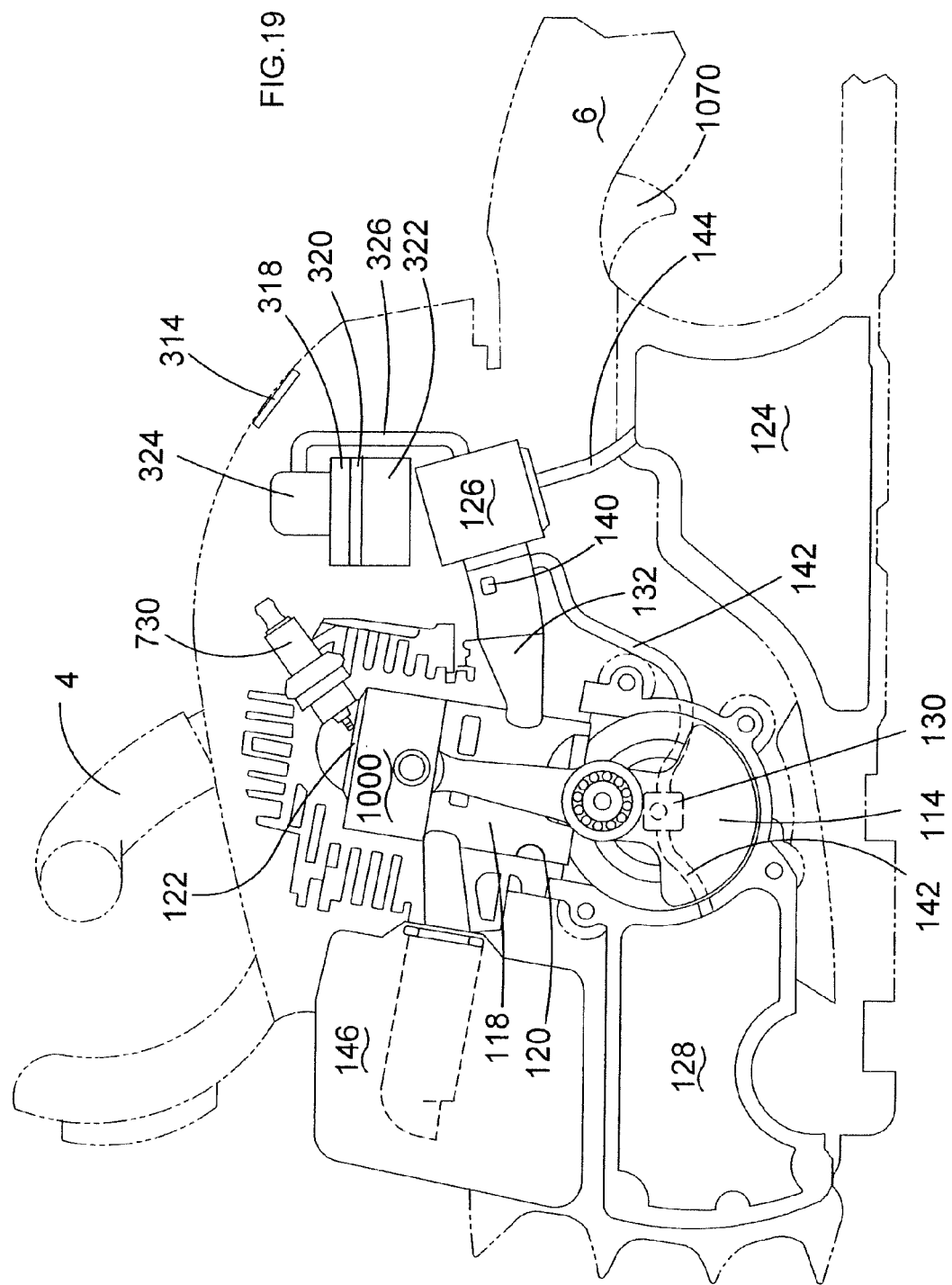

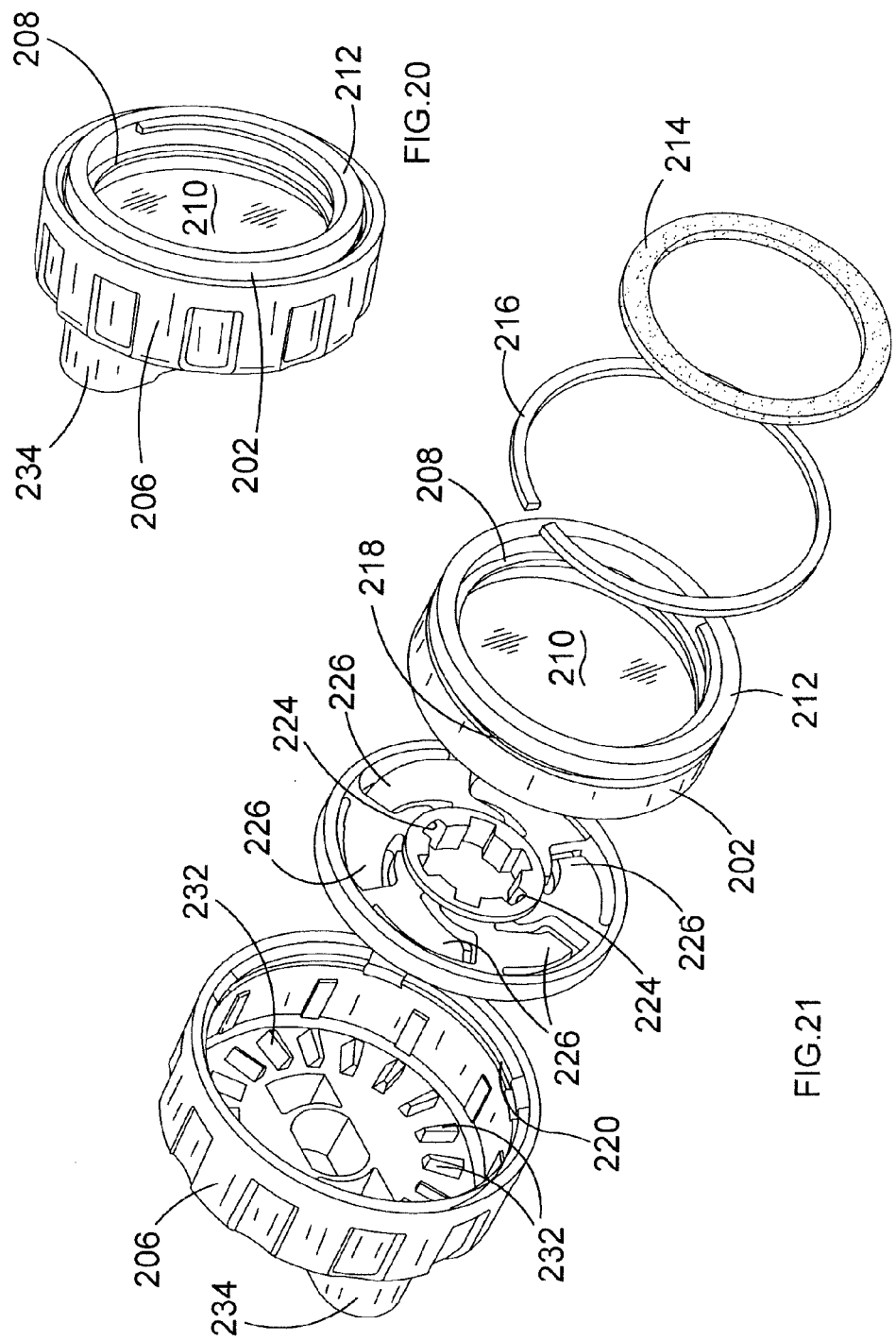

POWER CUTTER WITH CONTROLLER RESPONSIVE TO LUBRICATION STATUS

CROSS-REFERENCE TO RELATED APPLICATIONS

The present application is a national stage filing under 35 U.S.C. §371 of PCT/EP2008/058719 filed Jul. 4, 2008, which claims priority to GB 0712928.1 filed Jul. 4, 2007, both of which are incorporated by reference in its entirety.

TECHNICAL FIELD

The present invention relates to a power cutter.

BACKGROUND OF THE INVENTION

1. Field of the Invention

A typical power cutter comprises a housing in which is mounted a two stroke internal combustion engine. Attached to the side of the housing is a support arm which extends forward of the housing. Rotatably mounted on the end of the support arm is a cutting blade, usually in the form of a grinding disk. The motor is drivingly connected to the cutting blade via a drive belt. The rotary output of the engine rotatingly drives the cutting blade via the drive belt. The drive belt is driven via a centrifugal clutch which enables the out drive spindle of the engine to disengage from the belt when the engine is running at a slow speed, to allow the engine to continue running, whilst disengaging any drive to the cutting blade to allow the blade to be stationary.

Also mounted in the housing is a fuel tank which provides fuel for the engine via a carburetor. An oil tank can also be provided, which provides lubricating oil to mix with the fuel, to lubricate the engine.

Mounted on the rear of the housing is a rear handle for supporting the power cutter, which contains a trigger switch for accelerating the engine upon depressing. Depression of the trigger switch causes more of the aerated fuel/oil mixture to be injected into the engine which in turn causes the speed of the engine to accelerate.

GB2232913 and WO2005/056225 show examples of such power cutters.

2. Description of the Related Art

A known problem with all two stokes engines is the lubrication of the crank shaft 114 (using the reference numbers shown in FIG. 19) and piston 1000. This is due to the fact that the fuel/air mixture first passes through a chamber 18 in the cylinder 120 below the piston 1000 before being forced into the chamber 122 above the piston 16 before being ignited. This prevents the use of lubricating oil being pumped around the crank shaft 114 on the underside of the piston 1000. Therefore, in existing designs of two stoke engines, a mixture of aerated fuel and lubricating oil is burnt within the engine, the oil providing lubrication for the crank shaft 114 and piston 1000 prior to being burnt with the fuel during the combustion cycle. A common problem with the use of two stoke engines is that the operator forgets to add the oil to the fuel or adds it in an inconsistent manner, thus resulting in damage to the engine. This particularly so for power cutters as often power cutters are often hired out to operators. As such, operators are not familiar with using them; they are not in the operator's possession for long; the operator does not know who had it previously or how the previous operator used the power cutter; and, as the operator does not own it, has less reason to care for the long term maintenance of the power cutter. Therefore, it is desirable that a mechanism is provided to prevent or limit damage to the two stroke engine of the power cutter to ensure that sufficient lubrication oil is included in the aerated fuel which prior to entering the engine.

It is possible to add lubricating oil directly to the fuel in the fuel tank. However, this relies on the operator ensuring that the correct ratio of lubricating oil to fuel is achieved. This can be difficult as it may be hard to determine how much fuel is already in the fuel tank and how much lubricating oil has already been added. Therefore, it is preferable to have a separate oil tank which is filled with lubricating oil and which is then pumped from the tank and mixed with the fuel. This enables the amount of oil be added to the fuel to be controlled more accurately.

The two stroke engines of power cutters use a carburetor to provide aerated fuel for powering the engine. A typical design of such a carburetor is shown in FIG. 31. Referring to FIG. 31, the carburetor includes a housing 1002 through which is formed an air passageway 1004 through which air can pass in the direction of Arrow Q. The air passageway 1004 at its entrance and exit has the same cross-sectional area. However, formed part way along the length of the air passageway 1004, is a restriction 1006 which reduces the size of the cross sectional area of the air passageway and which acts as a venturi; the air passageway 1004 narrowing and then expanding as the air passes through it. This causes the rate of flow of air through the narrow section 1008 of the air passageway 1004 to increase.

Fuel enters the carburetor via an inlet 1010 and fills a first chamber 1012. The first chamber 1012 is connected to a second chamber 1014 via a fuel passageway 1016. Fuel fills the second chamber 1014 via the fuel passageway 1016.

An adjustable needle valve 1020, which has a pointed tip and an elongate body, is mounted in the fuel passageway 1016 and which can axially slide within the passage way 1016. The fuel passageway 1016 includes a narrow section 1018. The tip of the adjustable needle valve 1020 projects towards the narrow section 1018 and can block the narrow section 1018 when the adjustable needle valve 1020 is moved towards it or open the narrow section 1018 when it is moved away from it.

The rear end, remote from the tip, of the adjustable needle valve 1020 projects into the second chamber 1014. Attached to the rear end of the adjustable needle valve 1020 is a first lever 1022 which connects to a second lever 1024 via a pivot point 1026. One of the walls of the second chamber 1014 is a flexible diaphragm 1032 which can move to adjust the volume of the second chamber 1014. A hollow chamber 1034 is formed on the other side of the diaphragm 1032. The end of the second lever 1024 connects to the diaphragm 1032. The second lever 1024 also connects to a solid wall 1028 of the second chamber 1014 via a spring 1030. The spring 1030 biases the second lever to a predetermine position, which in turn biases the first lever 1022 to a predetermined angular position. Flexing of the diaphragm 1032 causes pivotal movement of the first and second levers against the biasing force of the spring 1030. Movement of the first lever 1022 causes an axial sliding movement of the adjustable needle valve 1020 moving its tip towards or away from the narrow section 1018.

A first passageway 1036 connects to the second chamber 1014 via a high speed needle valve 1038. The other end of the first passageway 1036 connects with the narrow section 1008 of the air passageway 1004. A second passageway 1040 connects to the second chamber 1014 via an idle needle valve 1042. The other end of the second passageway 1040 connects via three small vents 1044 with the air passageway 1004 down stream of the narrow section 1008. The high speed needle valve 1038 is preset and limits the rate of flow of fuel through the first passageway 1036. The idle needle valve 1042 is preset and limits the rate of flow of fuel through the second passageway 1040.

Located in the air passageway 1004, ahead of the narrow section 1008, is a first pivotal plate 1046 which acts as the choke for the carburetor. The plate 1046 can be pivoted between an open position (as shown) where it extends in the direction of the air passageway 1004, allowing the maximum amount of air to enter the passage 1004, to a closed position where it extends across the air passageway 1004, substantially reducing the amount of air able enter the air passageway 1004.

Located in the air passageway 1004, downstream of the narrow section 1008, is a second pivotal plate 1048 which acts as the throttle for the carburetor. The plate 1048 can be pivoted between an open position where it extends in the direction of the air passage 1004, allowing the maximum amount of air to leave the air passageway 1004, to a closed position where it extends across the air passageway 1004, substantially reducing the amount of air able to leave the air passageway 1004. The plate 1048 is shown half way between its open and closed positions.

When the carburetor is in normal use, the first pivotal plate 1046 is in its open position. Air is drawn through the air passageway passing through the narrow section 1008 which causes it to speed up. The movement of the air through the narrow section 1008 causes fuel to be drawn out of the first passageway 1036 into the air flow and then pass through the air passageway 1004. The amount of air, and hence the amount of fuel drawn out of the first passageway 1036, is dependent on the angular position of the second pivotal plate 1048. When it is in its open position, the maximum amount of air is able to pass through the air passageway, drawing out the maximum amount of fuel from the first passageway 1036. When it is in its closed position, the minimum amount of air is able to pass through the air passageway, drawing out the minimum amount of fuel from the first passageway 1036. In order to ensure that sufficient fuel enters the air flow in the air passageway 1004 when the second pivotal plate 1048 is in its closed position, the second passageway 1040 also provides fuel to the air flow. However, the exit of the second passageway 1040 connects to the air passageway down stream of the second pivotal plate 1048 to ensure that there is always sufficient fuel entering the air flow.

As fuel is drawn out of the two passageways 1036; 1040, the amount of fuel in the second chamber 1014 reduces. When the amount of fuel reduces, the diaphragm 1032 flexes, to reduce the volume of the second chamber 1014 to accommodate the loss of fuel. As the diaphragm 1032 flexes, it moves the first and second pivotal levers 1024; 1022 against the biasing force of the spring 1030, which in turn axially slides the adjustable needle valve 1020, moving its tip away from the narrow section 1018, opening it up and allowing fuel to flow from the first chamber 1012 into the second chamber 1014. As the second chamber 1014 fills up, the diaphragm 1032 flexes to accommodate the additional fuel, pivoting the levers and moving the tip of the adjustable needle valve 1020 towards the narrow section 1018 and reducing the amount of fuel flowing through the fuel passageway. Movement of the diaphragm 1032 ensures movement of the tip of the adjustable needle valve 1020 relative to the narrow section 1018 is controlled to limit the amount of fuel in the second chamber 1014.

When the engine is cold, the first pivotal plate 1046 is placed in its closed position. This reduces the amount of air entering the air passageway 1004 and therefore provides a higher ratio of fuel to air in the air passageway to enable the cold engine to run.

The angular position of the first pivotal plate 1046 is set using a Bowden cable connected to a separate lever which is adjusted manually by the operator of the power cutter. The angular position of the second pivotal plate 1048 is set using a Bowden cable connected to a trigger switch 1070 mounted on the handle which is manually adjusted by the operator.

A problem with this design of carburetor on a power cutter is that the operator has to be constantly adjusting the angular position of the first pivotal plate when the engine is cold to ensure the smooth operation of the engine. This is particularly difficult if the operator is also trying to use the power cutter.

SUMMARY OF THE INVENTION

Accordingly, there is provided a power cutter including a housing; a two stroke internal combustion engine mounted within the housing; a throttle switch by which the engine can be accelerated when the engine is running; a support arm mounted on the housing and which projects forward of the housing; a blade mounting mechanism rotatably mounted on the end of the support arm and which is capable of being rotationally driven by the engine when the engine is running; a carburetor for providing aerated fuel for the engine; an air intake for providing air for the carburetor; an air filtration mechanism to filter the air drawn in from the air intake for the carburetor; a fuel tank for providing fuel to the carburetor; and an exhaust through which the exhaust gases generated by the operation of the engine are expelled from the engine; an engine controller which controls the operation of the engine; an oil tank for providing lubricating oil for the engine; an oil pump to pump lubricating oil from the oil tank to mix it with fuel; and a sensing system which determines whether sufficient lubricating oil is being provided for mixing with the fuel in accordance with predetermined parameters. The sensing system provides an indication to the engine controller of when the lubricating oil is not being provided in accordance with the predetermined parameters, the engine controller switches the engine into either an idle mode or switching the engine off when the sensing system indicates that the lubricating oil is not being provided in accordance with the predetermined parameters.

It has been found that a two stoke engine can run for a long period of time without any lubricating oil being added to the fuel without damage to the engine occurring so long as the engine is run at a slow speed and without being under substantial stress. This is achieved by placing the engine in idle mode i.e. with the engine running at its minimal speed. As most power cutters drive the cutting blade via a centrifugal clutch, the drive of the engine on these types of power cutters is also disengaged from the cutting blade when the engine is running at a slow speed, reducing the stress on the engine. As such, when insufficient oil is detected, the engine can be placed in an idle mode, instead of stopping it, without the risk of incurring damage to the engine. The operator of the power cutter will realize that there is insufficient oil by the fact the engine has been placed into idle mode. Alternatively, the engine can be stopped to ensure that no damage occurs to it.

It will be appreciated by the reader that the oil may be pumped by the oil pump into the fuel tank to mix with the fuel within the tank or into the passage way carrying the fuel from the fuel tank to the carburetor. The fuel and oil mixture would then pass through carburetor where the oil/fuel mixture becomes aerated. Alternatively, the oil may be pumped directly into the carburetor to mix it with the fuel as it is being aerated. However, ideally, there is provided a passageway between the carburetor and the engine through which the aerated fuel generated by the carburetor passes from the carburetor to the engine, the oil pump pumping the oil into the passageway to mix with the aerated fuel within the passageway. If so, preferably the lubricating oil is pumped into the passageway in a liquid form, a spray form or in an atomized form.

The oil can be pumped into the passageway at a ratio relating to volume of around 1:50 in relation to the amount fuel entering the passageway.

When the engine controller has placed the engine in idle mode because the sensing system has indicated that the lubricating oil is not being provided in accordance with the predetermined parameters, the engine controller can prevent an operator from accelerating the engine by the operation of the throttle switch. When the engine has been placed into idle mode, it will override the action of the throttle switch which by the operator will try to use to accelerate the engine. This will prevent the operator from damaging the engine whilst indicating to the operator that the oil supply for the engine needs checking.

When the engine controller has switched the engine off because the sensing system indicates that the lubricating oil is not being provided in accordance with the predetermined parameters, the engine controller can prevent an operator from starting the engine again until sufficient oil is detected. When the engine is switched off by the engine controller. Again, the operator of the power cutter will realize that there is insufficient oil by the fact the engine has been switch off and is prevented from being started again.

Ideally, the engine comprises at least one spark plug, a piston slidably mounted within a cylinder and which is connected to a rotatable crank shaft, the ignition of the spark plug being controlled by the engine controller, wherein there is provided a sensor connected to the engine which monitors the angular position of crank shaft and provides the engine controller with a position signal dependent of the crank shaft angular position, the engine controller using the position to control the ignition of the spark plug to switch the engine to an idle mode or to switch the engine off.

If so, the engine controller can alter the timing of the ignition of the spark plug relative to the angular position of the crank shaft to place the engine in idle mode. In addition, the engine controller can alter the number of ignitions of the spark plug relative to the number of rotations of the crank shaft to place the engine in idle mode. The engine controller can ignite the spark ever two or three rotations of the crank shaft, for example providing only a half or a third of the power than if the spark plug was ignited every rotation, as would be the case during the normal operation of the engine.

Alternatively the engine controller stops the engine by stopping the ignition of the spark plug.

The sensor system can include a sensor located in a passageway through which the oil flows, the sensor measuring a parameter of the flow of the lubricating oil in the passageway and generating a signal which is a function of that parameter; and a signal processor which processes the signal to determine whether the lubricating oil is being pumped into or through the passageway in accordance with the predetermined parameters and provides an indication to the engine controller when the lubricating oil is not being pumped into the passageway in accordance with the predetermined parameters.

The passageway can be the passageway between the carburetor and the engine through which the aerated fuel generated by the carburetor passes from the carburetor to the engine. The passageway can also be an oil passageway.

The signal processor is integral with the sensor. Alternatively, the signal processor may form part of the engine controller.

The sensor may comprise at least two electrically conductive plates located in the passageway in close proximity to each other wherein the signal is dependent on the change in capacitance of the plates.

The oil pump may be driven by a crank shaft of the engine.

In an alternative design, the oil pump may be powered by an electrical power supply having a sensing system comprising monitoring means which monitors the voltage and/or current of the electrical power supply of the oil pump during the operation of the oil pump. The sensing system determines whether lubricating oil is being pumped into the passageway by analyzing the values of the voltage and/or current of the electrical power supply to determine whether sufficient lubricating oil is being provided compared with predetermined parameters and provides an indication to the engine controller when the lubricating oil is not being pumped in accordance with the predetermined parameters. For an electrically powered oil pump, it has been found that the voltage and/or current drawn by the oil pump during its operation is altered depending on how much oil is being pumped by the oil pump. In particular, there is a difference when the oil pump is pumping oil during the normal curse of operation and when it is operating with no oil to be pumped. In such a case, the sensing system can be incorporated into the engine controller.

BRIEF DESCRIPTION OF THE DRAWINGS

Two embodiments of the invention will now be described with reference to the accompanying drawings of which:

FIG. 3 shows a horizontal cross section of the belt drive and support arm;

FIG. 4 shows the forward and rearward sections of the support arm;

FIG. 19 shows the vertical cross section of the body of a power cutter;

FIG. 20 shows a perspective view of the fuel cap;

FIG. 21 shows an exploded view of the fuel cap from a first side;

DETAILED DESCRIPTION OF THE INVENTION

Figure 1:
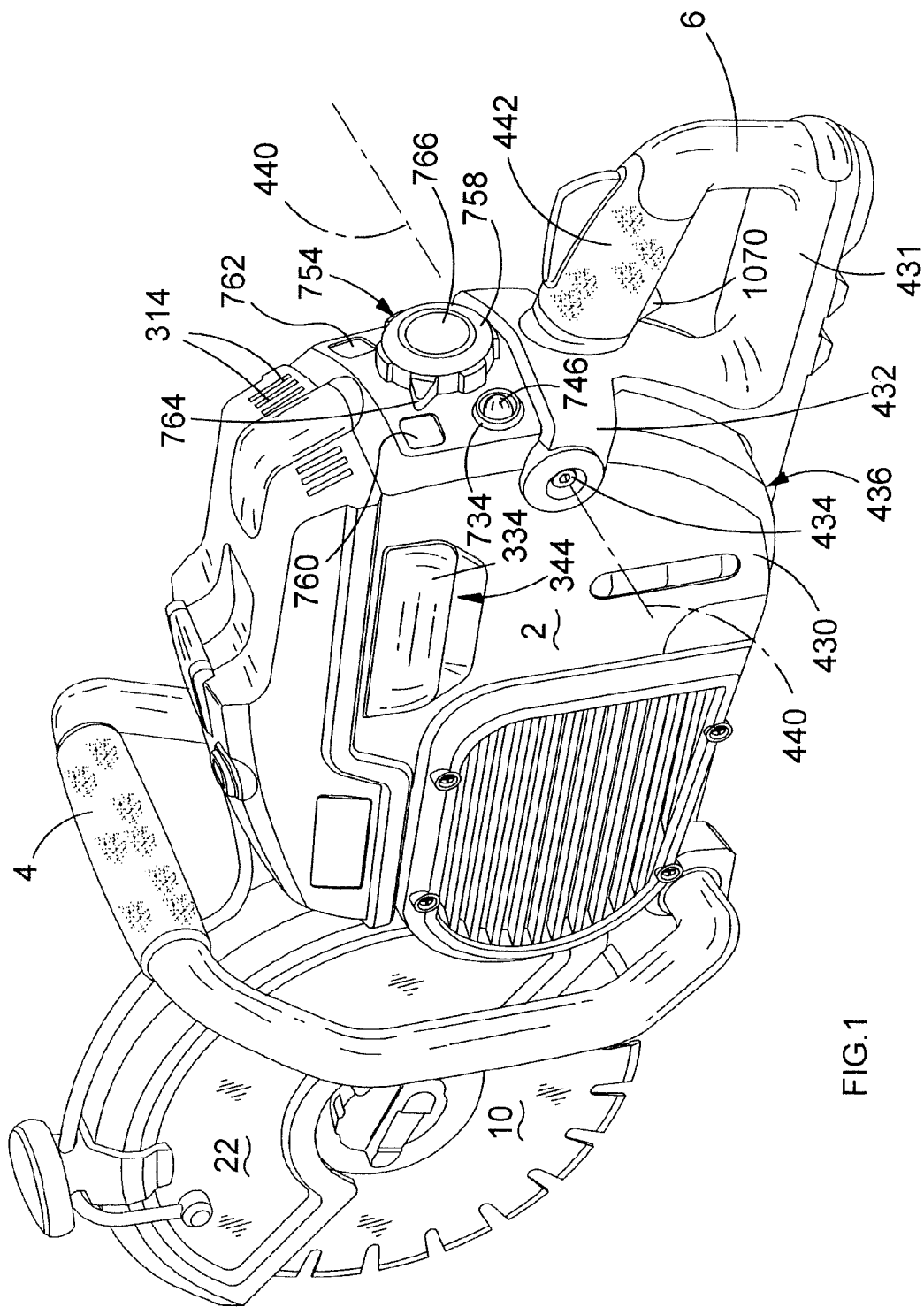
FIG. 1 shows a perspective view of the power cutter from a first side.
Figure 2:
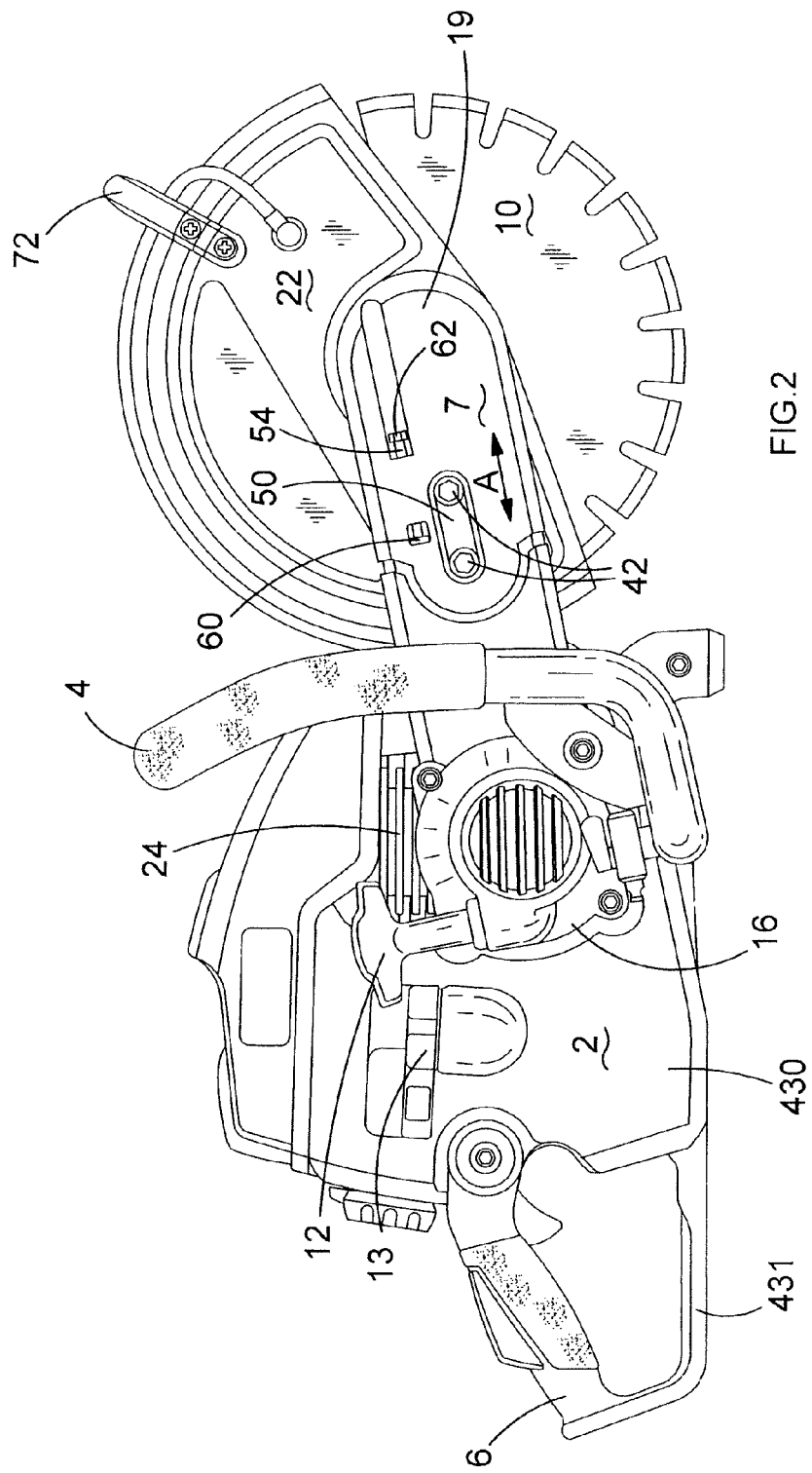
FIG. 2 shows a side view of the power cutter from a second side.

Referring to FIGS. 1 and 2, the power cutter comprises a body 2 in which is mounted a two stroke internal combustion engine 24, a front handle 4, a rear handle 6, a support arm 7, a cutting blade 10, rotatably mounted on the support arm 7 and driven by the engine 24 via a rubber belt 26 and a blade guard 22. A starter 12 is provided to activate the engine 24. A plastic cover 19 covers the out side of the support arm 7 as shown in FIG. 2.

Referring to FIG. 3, the support arm 7 comprises two sections, a forward section 8 and a rearward section 20. The rearward section 20 is made from cast iron and is rigidly attached to the side of the gear housing 32 using bolts (not shown). The forward section 8 is made of cast iron and is slidably mounted on the rearward section 20. The forward section can slide in the direction of Arrow A. The method by which the forward section 8 is slidably mounted on the rearward section 20 is described in more detail below.

The engine 24 has an output shaft 28 on which is mounted a drive wheel 30 for the rubber belt 26. The output shaft drives the drive wheel 30 via a centrifugal clutch (not shown) in known manner. A driven wheel 32 is rotatably mounted on the end of the forward section 8 of the support arm. The driven wheel 32 is connected to the cutting blade 10 which is also mounted on the forward section 8 as described below. The belt 26 passes around the rearward section 20, between the two wheels 30, 32 to transmit the rotation of the engine to the cutting blade 10. The purpose of enabling the forward section 8 to slide in relation to the rearward section 20 is to enable the belt 26 to be tensioned as described below. A hub 16 covers the drive wheel 30.

The interconnection between rearward and forward sections of the support arm 7 will now be described with reference to FIGS. 3, 4, 5 and 6.

Referring to FIGS. 3 and 4, the rearward section 20 comprises two elongate slots 40 formed through the width of the rearward section 20. The elongate slots 40 are aligned with each other, are of equal length, and run lengthways along rearward section 20 of the support arm. Formed through the forward section 8 are two corresponding holes 46. The part of the forward section 8 with the holes 46 is located alongside of the part of the rear section 20 with the elongate slots 40 so that the holes 46 align with a corresponding slot 40. A bolt 42 passes through each hole 46 and corresponding slot 40. A nut 44 is screwed onto the bolt 42 to sandwich the rearward and forward sections together and hold them in place using friction. The slots 40 enable the bolts 42, and hence the forward section 8, to slide relative to the rearward section 20.

In order to slide the rearward section 20 relative to the forward section 8, the nuts 44 are slackened so that the two can move relative to each other. The forward section 8 is then slid (using the belt tensioner described below) to the desired position, and then the nuts 44 are tightened to sandwich the rearward section 20 to the forward section 8 to prevent movement between the two.

The forward and rearward interconnection mechanism is designed so that the forward section 8 can be located on either side of the rearward section 20 as shown in FIG. 2. In normal operation, the forward section 8 is located on the same side of the rearward section 20 as the engine 24. This is indicated as position B. In this position, the cutting blade 10 is located closer to the central axis of the power cutter. However, it is sometimes desirable to have the cutting blade located towards the edge of the body 2 to enable it to cut near to a wall. The forward section 8 can then be moved to the other side of the rearward section 20 and be rotated through 180 degrees about the longitudinal axis 48 of the forward section 8 as indicated by Arrow D to the position C. In both orientations, the driven wheel 32 locates in the same position so that it can be driven by the belt 26.

The belt tensioner will now be described with reference to FIGS. 4, 5 and 6

Figure 5:
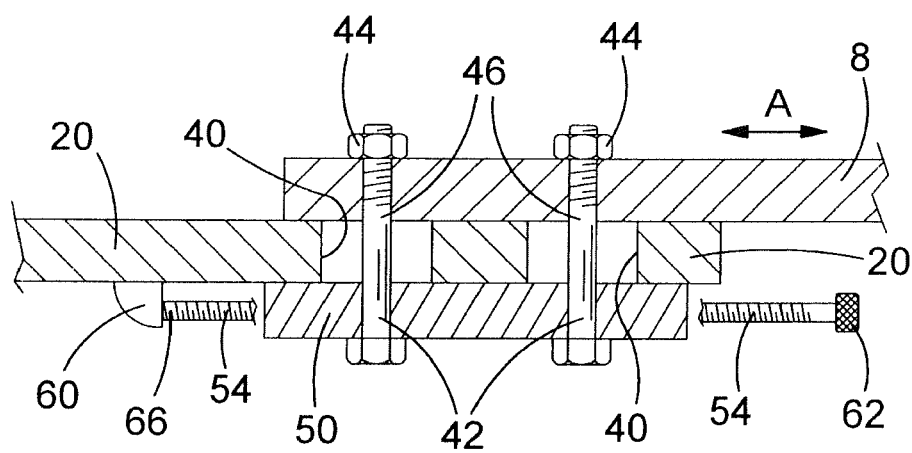
FIG. 5 shows a horizontal cross sectional view of the connection between the rearward and forward sections of the support arm.
Figure 6:
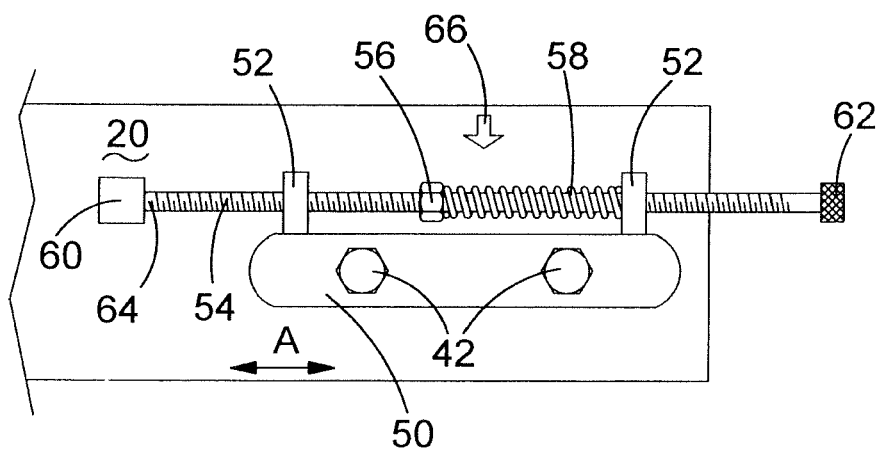
FIG. 6 shows the belt tensioner.

Referring to FIGS. 5 and 6, the belt tensioner comprises a metal plate 50 having two holes 46 through which the bolts 42 pass as seen in FIG. 4. The position of the plate 50 is fixed by the position of the bolts 42. Formed on the metal plate 50 are two hoops 52 which form apertures which are aligned. The shaft of an elongate bolt 54 passes through the hoops 52. The elongate bolt 54 can freely rotate and axially slide within the hoops 52. Threadedly mounted onto the bolt 54 is a nut 56. A spring 58 is sandwiched between the nut 56 and one of the hoops 52. The spring 58 prevents the nut from rotating. Therefore, as the bolt 54 is rotated, the nut 56 travels along the length of the bolt 54 in a direction dependent on the direction of rotation of the bolt 54. The position of the nut 56 is fixed relative to the hoop 52 by the spring 58. A stop 60 is integrally formed on the rearward section 20 of the supporting arm.

In order to tension the belt 26, the elongate bolt is rotated so that the nut moves towards the head 62 of the bolt 54. As its position is fixed by the spring 58, the nut remains stationary relative to the hoop 52 causing the bolt 54 to axially move within the hoops 52 so that the end 64 of the bolt 54 approaches the stop 60. Upon engagement of the stop 60, the end 64 and hence the bolt 54, cannot move further and therefore the nut begins to move. The movement of the nut causes the spring 58 and hence the hoop 52 to move towards the head 62 of the elongate bolt 54. This in turn results in the plate 50, the two bolts 42 and the forward section 8 to move with the nut 56, the bolts 42 sliding within the two slots 40. However, when the belt 26 becomes tight, the forward section 8, and hence the bolts 42 and plate 50 are prevented from moving further. However, if the elongate nut 54 is further rotated, the nut 56 will continue to travel along its length. Therefore, the spring 58 becomes compressed, applying a force onto the hoop, and hence plate 50, which in turn transfers it to the forward section 8. This tensions the belt 26. The more compression of the spring 58, the more force is applied to the belt 26. An indicator 66 is added to the plate 50 to show when the amount of the compression of the spring 58 is sufficient to apply the correct amount of force to the belt 26.

The blade mount on the forward section 8 will now be described.

Figure 7:
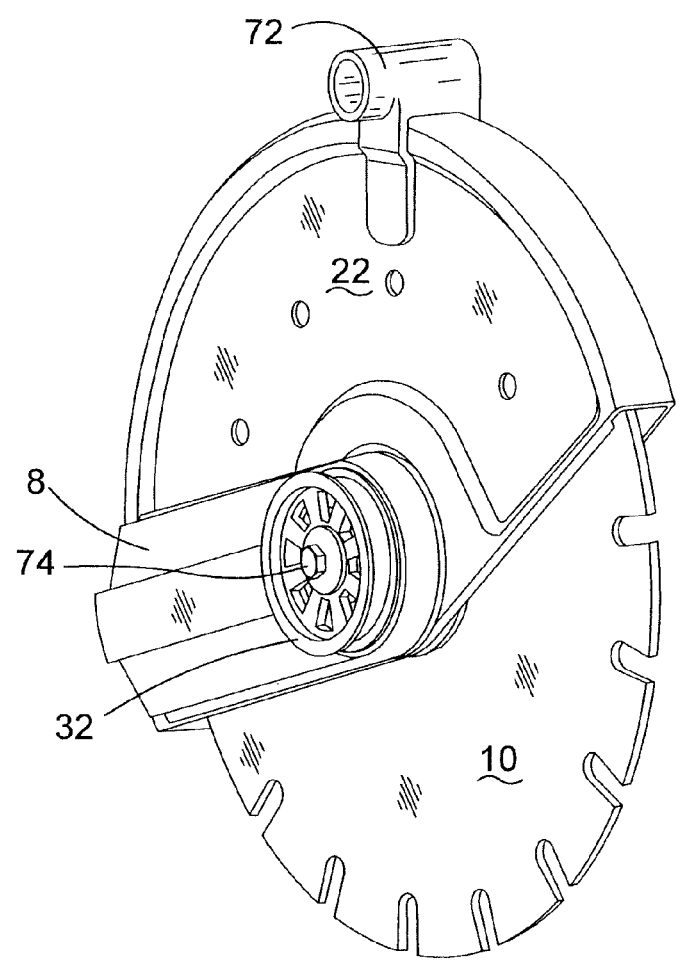
FIG. 7 shows a drawing of the forward section, driven wheel, blade and blade guard.

Referring to FIG. 7, the driven wheel 32 is rotatably mounted on the forward section 8. The driven wheel 32 is drivingly connected to the cutting blade 10 via a spindle 70 as will be described in more detail below. The blade guard 22 is pivotally mounted around the spindle 70 as will be described in more detail below. A grasp 72 is rigidly attached to the blade guard 22 which can be held by an operator in order to pivot the blade guard 22.

FIGS. 12 to 18 show the mechanism by which the forward support 8 rotatably supports the cutting blade 10.

Figure 17:
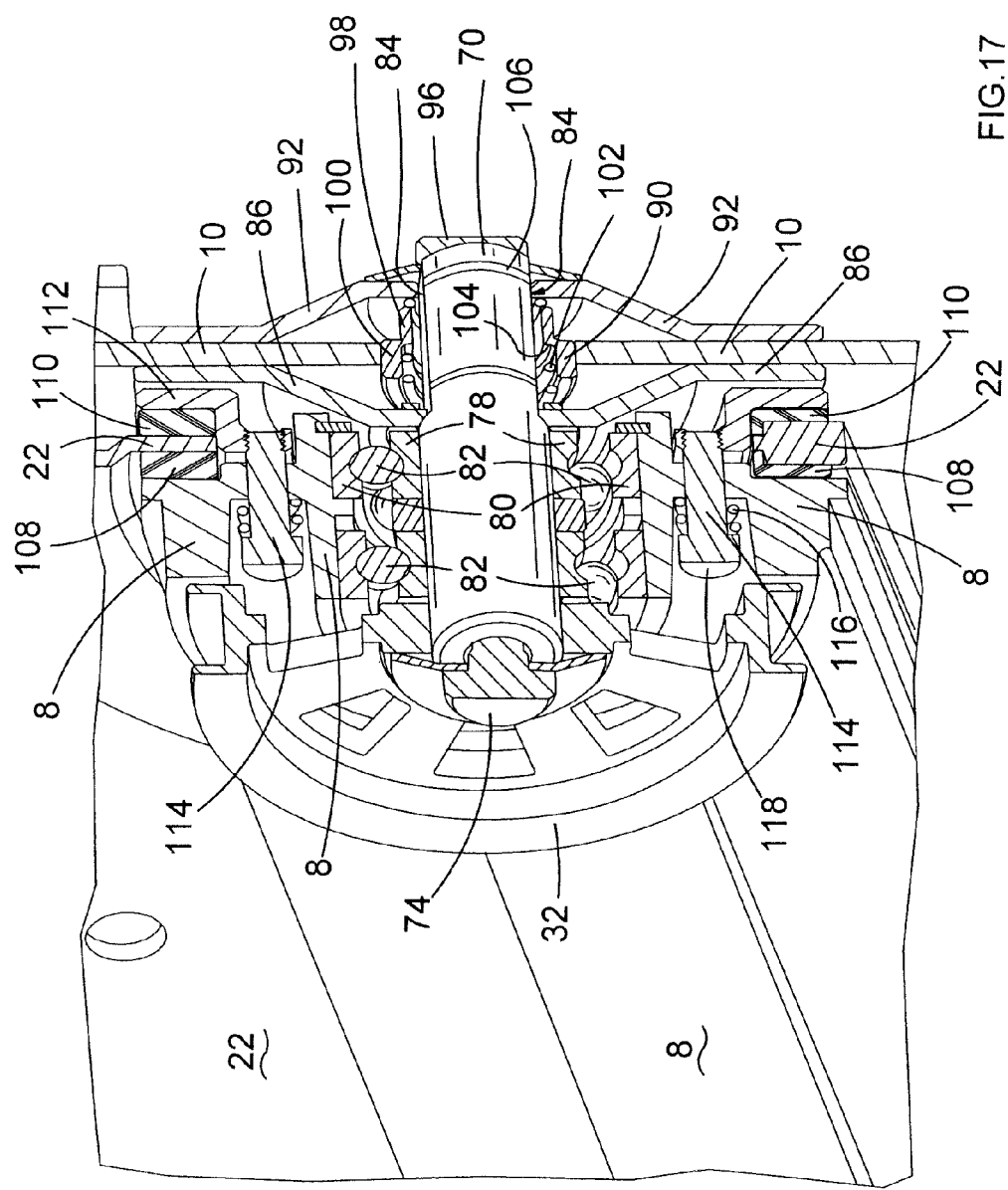
FIG. 17 shows a drawing of a cut away view of the rotary support mechanism from a first perspective.
Figure 18:
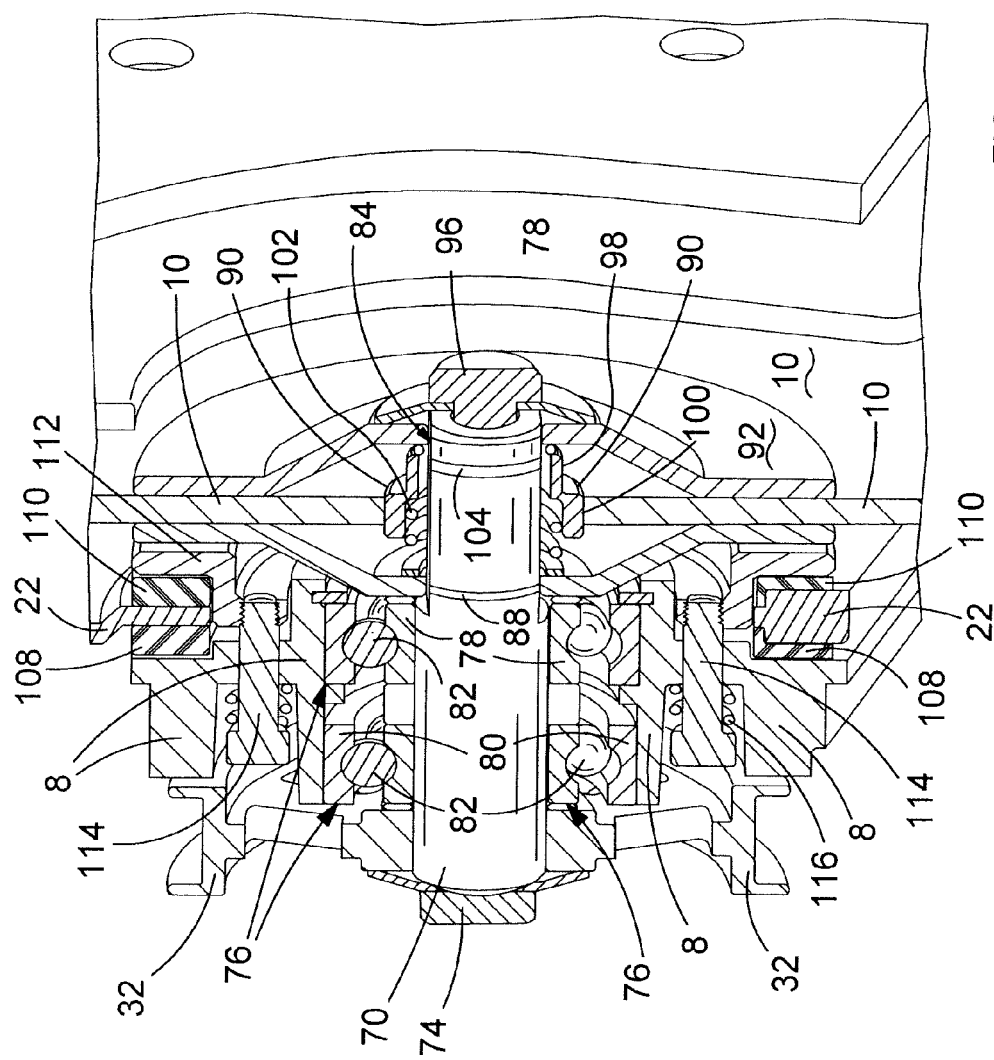
FIG. 18 shows a drawing of a cut away view of the rotary support mechanism from a second perspective.
Figure 22:
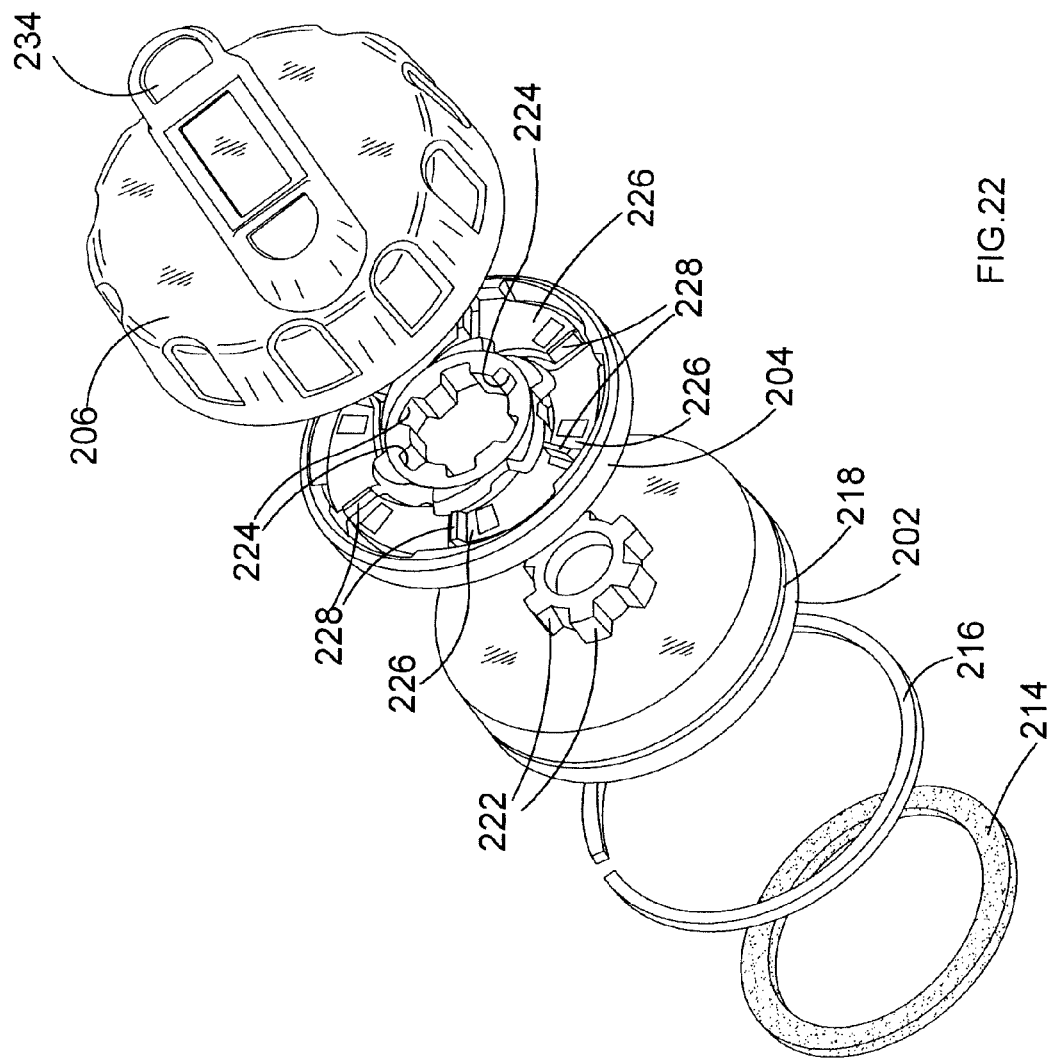
FIG. 22 shows an exploded view from a second side.
Figure 23:
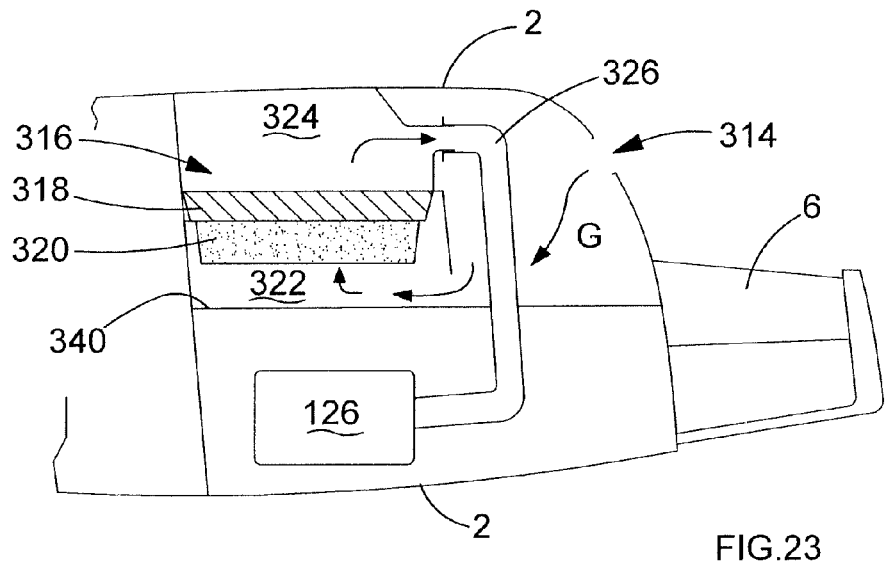
FIG. 23 shows a vertical cross section of the part of the power cutter with the air filter.

Referring to FIGS. 17 and 18, the driven wheel 32 is rigidly attached to the spindle 70 via a flanged nut 74. Rotation of the driven wheel 32 results in rotation of the spindle 70. The spindle 70 is mounted in the forward section 8 using two ball bearing races 76, each comprising an inner track 78 rigidly connected to the spindle 70, an outer track 80 rigidly connected to the forward support 8, and a set of ball bearings 82 sandwiched between the two tracks 78, 80 which allow the outer track 80 to rotate relative to the inner track 78.

Figure 16:
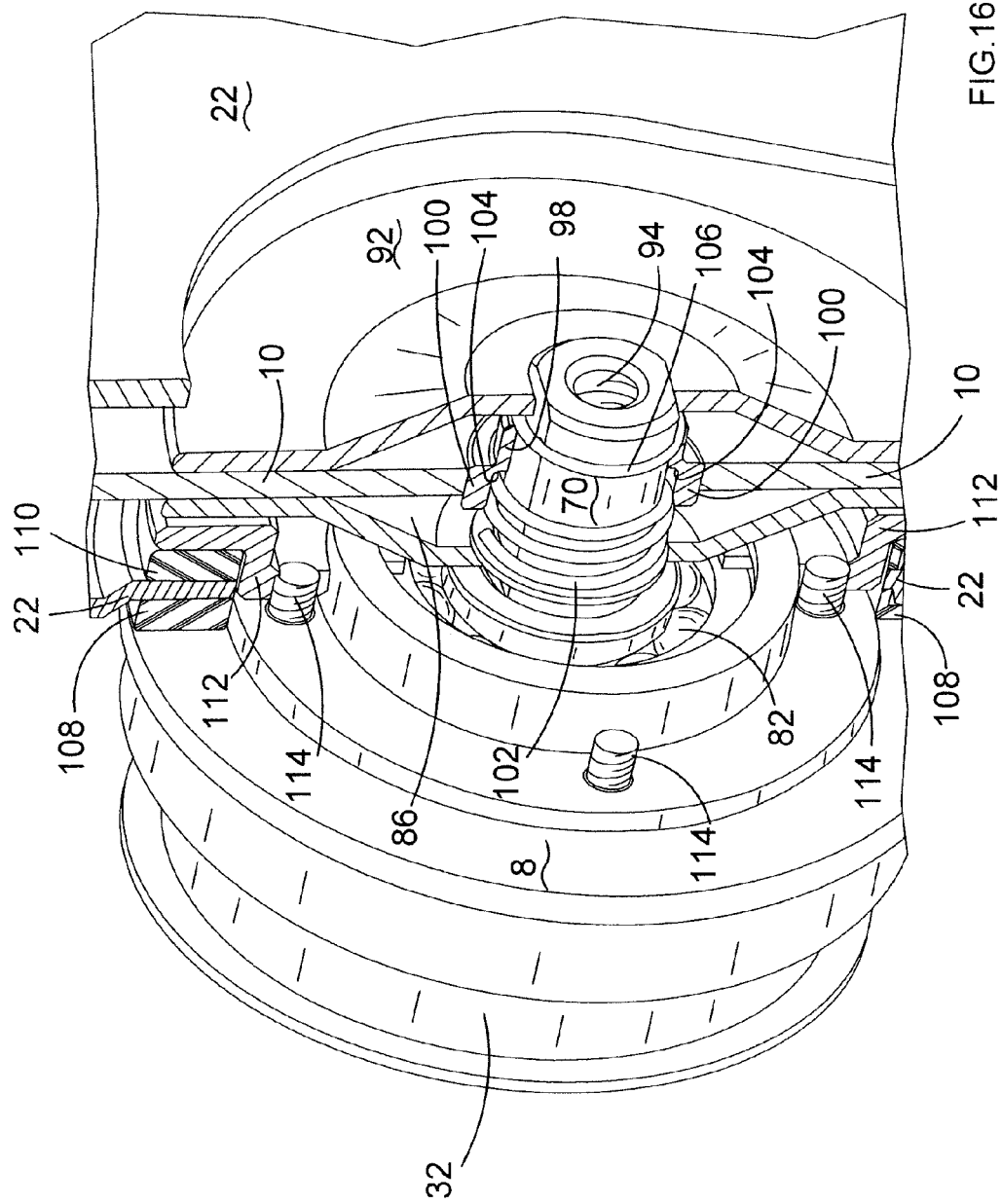
FIG. 16 shows a cut away view of the blade support.

Formed along a part of the length of the spindle 70 are two flat surfaces 84 (see FIG. 16). A second support disk 86 comprises a central hole which is predominantly circular with the same diameter of the spindle 70, but with two flat sides which correspond in dimensions to the flat surfaces 84 of the spindle 70. The second support disk 86 is mounted on the end of the spindle 70 and abuts against shoulders 88 on the spindle 70 formed by the two flat surfaces 84. The flat surfaces 84 ensure that the second support disk is rotationally fixed to the spindle 70 so that rotation of the spindle 70 results in rotation of the second support disk 86.

An adaptor 90 (described in more detail below) is mounted on the spindle 70. The adaptor can freely rotate about the spindle 70. The cutting blade 10 is mounted on the adaptor 90.

A first support disk 92 comprises a central hole which is predominantly circular with the same diameter of the spindle 70, but with two flat sides which correspond in dimensions to the flat surfaces 84 of the spindle 70. The first support disk 92 is mounted on the end of the spindle 70 and abuts against the cutting blade 10. The flat surfaces 84 ensure that the first support disk 92 is rotationally fixed to the spindle 70 so that rotation of the spindle 70 results in rotation of the first support disk 86.

Figure 10:
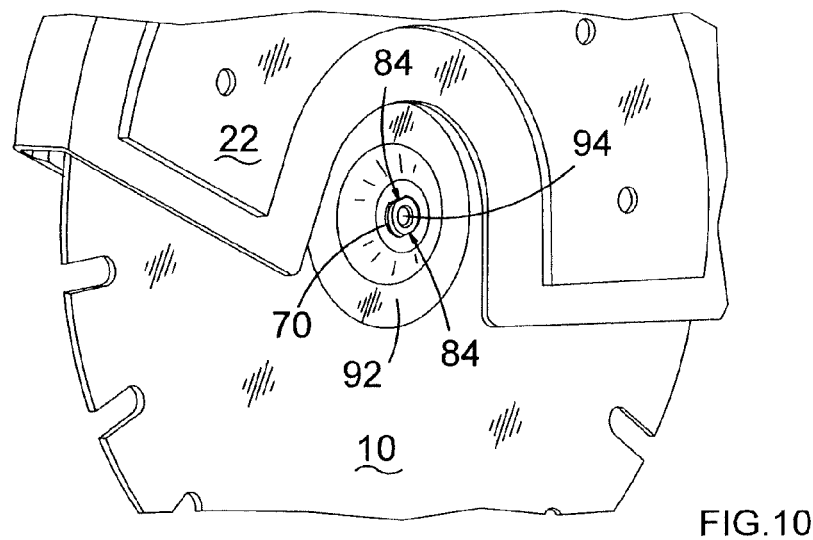
FIG. 10 shows a drawing of a close up the blade and blade guard without the holding nut.
Figure 11:
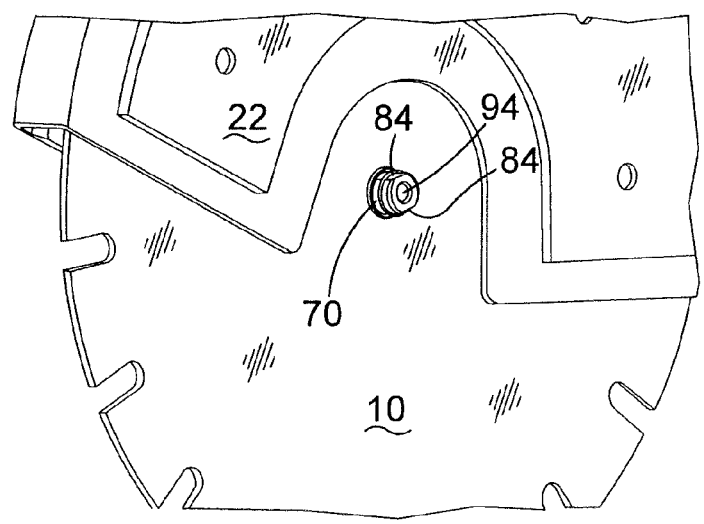
FIG. 11 shows a drawing of a close up the blade and blade guard without the first support disk.
Figure 12:
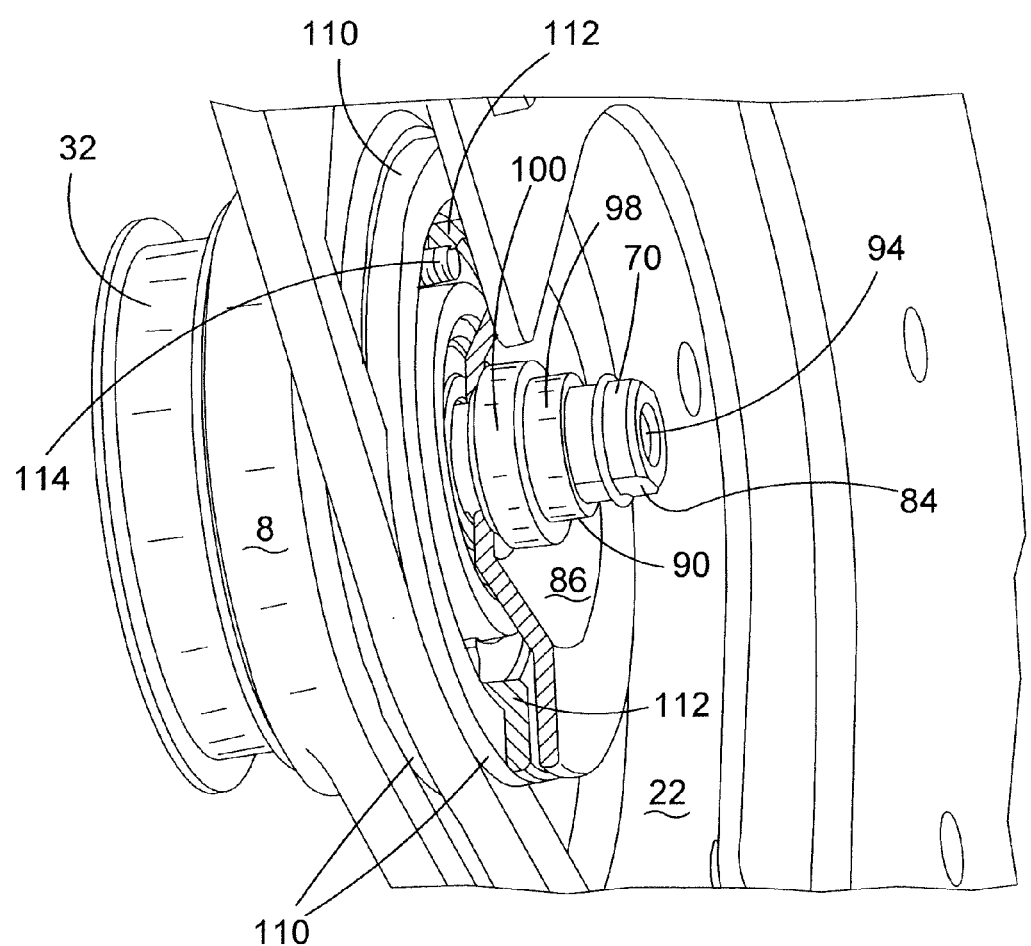
FIG. 12 shows a drawing of forward support with the blade guard.

A threaded hole 94 is formed in the end of the spindle 70 (see FIGS. 10 to 12). A second flanged nut 96 is screwed into the hole 94. The flange of the nut 96 pushes the first support disk 92 against the blade 10 which in turn pushes the blade 10 against the second support disk 86. The blade 10 becomes sandwiched between the two support disks 86, 92. Rotation of the support disks 86, 92 by the spindle 70 results in rotation of the blade due to the frictional contact of the blade 10 being sandwiched between the two disks 86, 92. By frictionally driving the blade 10, it allows rotational movement of the blade 10 relative to the spindle 70 if the blade becomes snagged during the operation of the power cutter.

The automatic blade support adjustment mechanism will now be described.

Cutting blades of different sizes can be used. Different sized cutting blades 10 have different sized holes in their centers through which the spindle 70 passes. It is intended that the present power cutter will be able to fit cutting blades 10 having two different sizes of hole through their centers. This is achieved by the use of the adaptor 90.

Referring to FIGS. 17 and 18, the adaptor is mounted on the spindle 70 between the two support disks 86, 92. As well as being freely rotatable about the spindle 70, the adaptor 90 can axially slide along the spindle 70 between the disks 86, 92.

Figure 13:
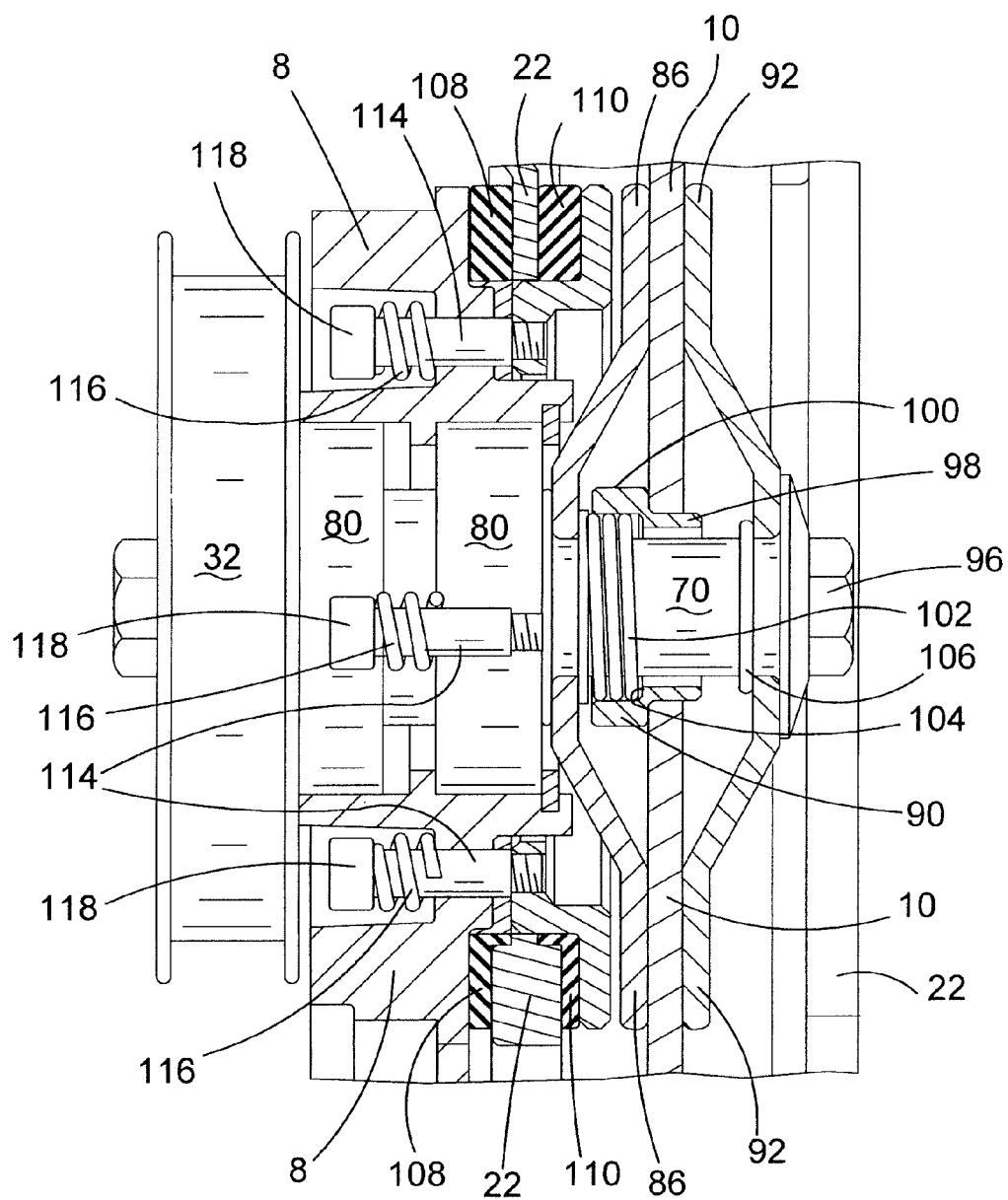
FIG. 13 shows a drawing of a cut away view of the rotary support mechanism from the side with the adapter in the first position.
Figure 14:
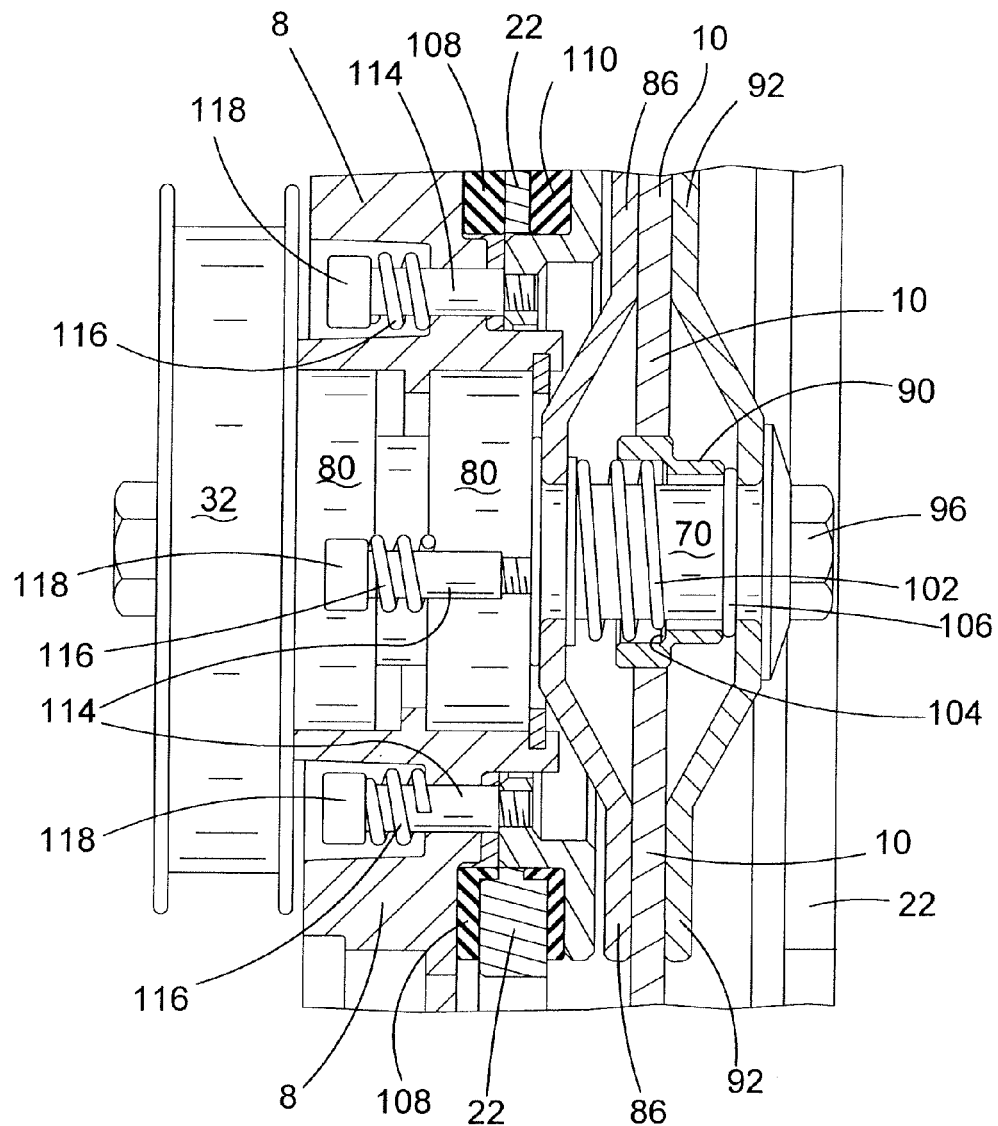
FIGS. 14 and 15 show cut-away views of the rotary support mechanism from the side with the adapter in the second position.

The adaptor comprises a front section 98 and a rear section 100. The front section 98 has a first outer diameter, the rear section 100 has a second larger outer diameter. The two sections allow blades 10 with holes of different diameters to be mounted onto the spindle 70. In FIGS. 14 to 18, it can be seen that a blade 10 with a central hole of a first diameter is mounted on the rear section 100 of the adaptor 90. In FIG. 13, it can be seen that a blade 10 with a central hole of a second diameter is mounted on the front section 98 of the adaptor 90.

A spring 102 is sandwiched between the second support disk 86 and an inner shoulder 104 of the adaptor 90. The spring 102 biases the adaptor towards the first support disk 92. A circlip 106 is located around the spindle 70 which limits the maximum extent of axial travel of the adaptor 90. When the adaptor 90 is allowed to slide to its maximum extent and abut against the circlip 106, the rear section 100 is located centrally between the support disks 86, 92.

When a blade 10, having a center hole with the same diameter of the rear section 100 of the adaptor is mounted onto the adapter, it fits onto the rear section 100 of the adaptor as shown in FIGS. 14 to 18. As such, the blade 10 is centrally located between the two support disks 86. 92. However, when a blade 10, having a center hole with the same diameter of the front section 98 of the adaptor is mounted onto the adapter, it fits onto the front section 98 of the adaptor as shown in FIG. 13. It is prevented from sliding onto the rear section. In order for the blade 10 to be secured onto the spindle 70 by the support disks 86, 92, it must be located centrally between the two. When the first support disk 92 is mounted onto the spindle 70 after the blade, it pushes the blade 10 and adaptor 90 against the biasing force of the spring 102, moving the adaptor 90 towards the second support disk 86 as shown in FIG. 13. When the blade is securely mounted on the spindle 70, it is centrally located between the support disks. The front section is similarly mounted centrally. The adaptor enables two types of blade 10 to be used, it moving automatically in accordance with blade size.

The pivotal blade guard 22 will now be described.

Figure 15:
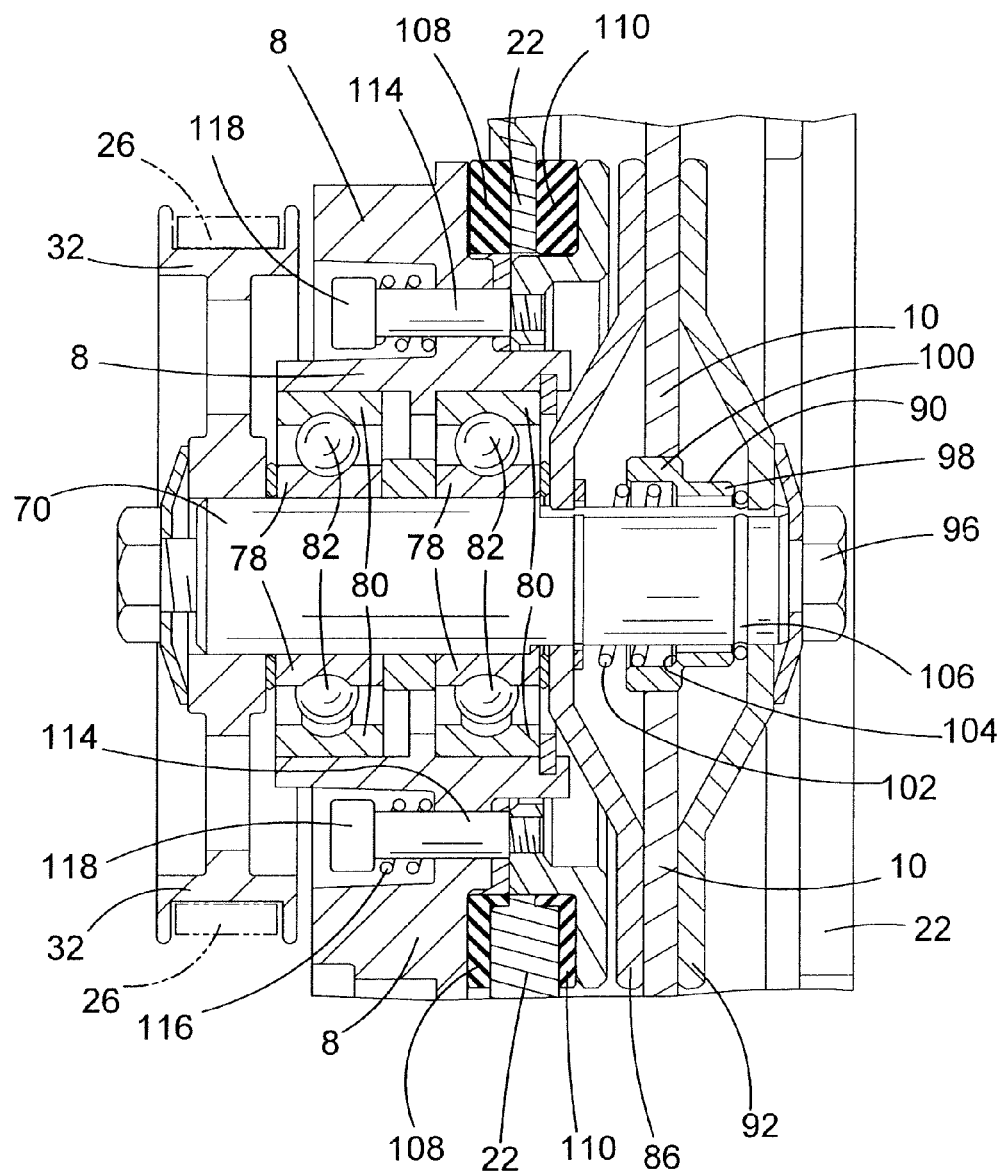

Referring to FIG. 15, the blade guard 22 is held by being sandwiched between two pieces of rubber 108, 110. The blade guard 22 can pivot about the spindle 70. However, it is frictionally held by the two pieces of rubber 108, 110. In order to pivot the guard 22, the operator must overcome the friction between the guard 22 and the rubber 108, 110.

A metal bracket 112 is attached to the forward section 8 via four bolts 114. The bolts pass freely through the forward section 8 and threadedly engage with threaded holes formed in the bracket 112. A helical spring 116 is sandwiched between the head 118 of each bolt 114 and the forward section 8, biasing the bolts 114 out of the holes, pulling the bracket 112 towards the forward section. Sandwiched between the bracket and the forward section 8 is a first piece of rubber, 108, the guard 22, a second piece of rubber 110 to form a rubber—guard—rubber sandwich. The strength of the spring 116 determines the amount of frictional force there is between the rubber 108, 110 and the guard.

In order to pivot the guard the operator holds the grasp 72 and pivots the guard 22 by overcoming the frictional force between the guard and the rubber 108, 110.

A first design of oil and fuel management system will now be described with reference to FIG. 19.

The two stroke internal combustion engine comprises a cylinder 120 in which is slidably mounted a piston 1000 which is connected to a rotatable crank 114. The reciprocating motion of the piston 100 in the cylinder 120 causes a rotational movement of the crank shaft 114 in well known manner. Movement of the piston is caused by the burning of aerated fuel/oil mixture in the cylinder, the ignition of which is caused by the ignition of a spark plug 730. The engine burns the fuel in well known manner to generate rotary motion of its crank shaft 114, which connects to the output shaft 28. The exhaust gases are then expelled from the engine 24 through an exhaust 146 to the surrounding atmosphere. The speed of the engine is determined by the amount of aerated fuel/oil mixture the carburetor 126 provides to the engine which in turn is dependent on the amount the operator depresses the trigger switch 1070.

The power cutter will comprise a fuel tank 124 in which is located fuel for driving the two stroke internal combustion engine 24. Fuel will pass from the tank 124 via passageway generally indicated by dashed lines 144 through the carburetor 126 which will mix it with air prior to being forwarded to the cylinder 120 where it will be burnt. Details of the supply of air, including its filtration will be described in more detail below. A second tank 128 will also be mounted in the body 2 as shown, in which lubricating oil will be contained. The oil will be pumped out of the tank 128 via a standard design of oil pump 130, which is mounted on the crank shaft housing which will be driven via a gear arrangement (not shown) from the crank shaft 114. The oil pump 130, will pump the oil through the oil passageways indicated by dashed lines 142 from the oil tank 128 via the pump 130 into the passageway 132 between the carburetor 126 and the cylinder 120, in a suitable form, for example, as a liquid or as a spray or atomized, and then mixing the oil with the air/fuel mixture generated by the carburetor 126. It will inject oil at the ratio 1:50 in relation to the fuel.

A sensor unit 140 will comprise a sensor which will be mounted within the passageway 132 between the carburetor 126 and cylinder 120, or in the oil passageways 142 adjacent the passageway 132. The sensor will measure a parameter of the flow of the oil within the passageway and determine, using a signal processor incorporated into the sensor unit, whether oil is being pumped correctly in accordance with predetermined parameters into the passageway 132 either by checking the pressure of the oil as it enters the passageway 132 or by detecting the presence of oil in the passageway 132. Such a parameter could be the rate at which the oil is pumped into the passageway 132.

Figure 32:
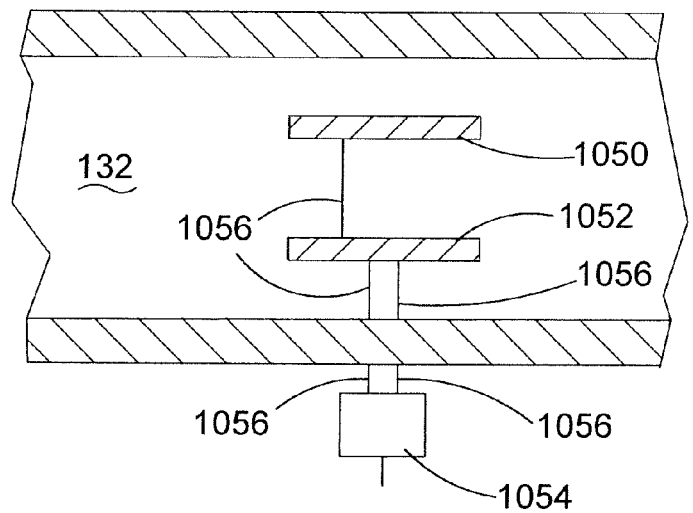
FIG. 32 shows a design of a capacitance sensor unit.

The construction of one type of sensor unit will now be described with reference to FIG. 32. The sensor unit comprises a sensor consisting of two metal plates 1050; 1052 which are connected via wires 1056 to a signal generator/signal processor 1054. The metal plates are located within the passageway 132 between the carburetor 126 and cylinder 120, down stream of the oil passageways 142. The signal generator/signal processor 1054 sends a signal to the plates 1050; 1052 to determine the capacitance of the two plates. The capacitance is dependent on the material between the plates 1050; 1052 which will consist of aerated fuel and lubrication oil. As the amount of lubrication oil changes, the capacitance of the plates changes. This capacitance will be analyzed by the signal generator/signal processor 1054 which, if the capacitance extends outside of a predetermined limit, will provide a signal to an electronic ignition system.

The engine is controlled by the electronic ignition system. The sensor unit 140 will provide signals to the electronic ignition system about the amount of oil being pumped into the passageway 132. In the event that insufficient, excessive or no oil is pumped into the passageway due to the fact that the oil tank is empty or there is a blockage in an oil pipe 142 or there is a fault with the pump, the sensor unit 140 will send the signal to the ignition system. The ignition system will then either switch the engine into an idle mode or switch the engine off entirely, depending on the settings of the ignition system. This will ensure that lubricating oil is always added to the fuel in the correct amount prior to combustion within the two stroke engine.

It will be appreciated by the reader that though the sensor unit 140 has been described as having the signal generator/signal processor 1054 incorporated in the sensor unit 140, the signal generator/signal processor 1054 could be incorporated into the electronic ignition system with the sensor unit only comprising the sensor.

A second design of oil and fuel management system will now be described.

Figure 33:
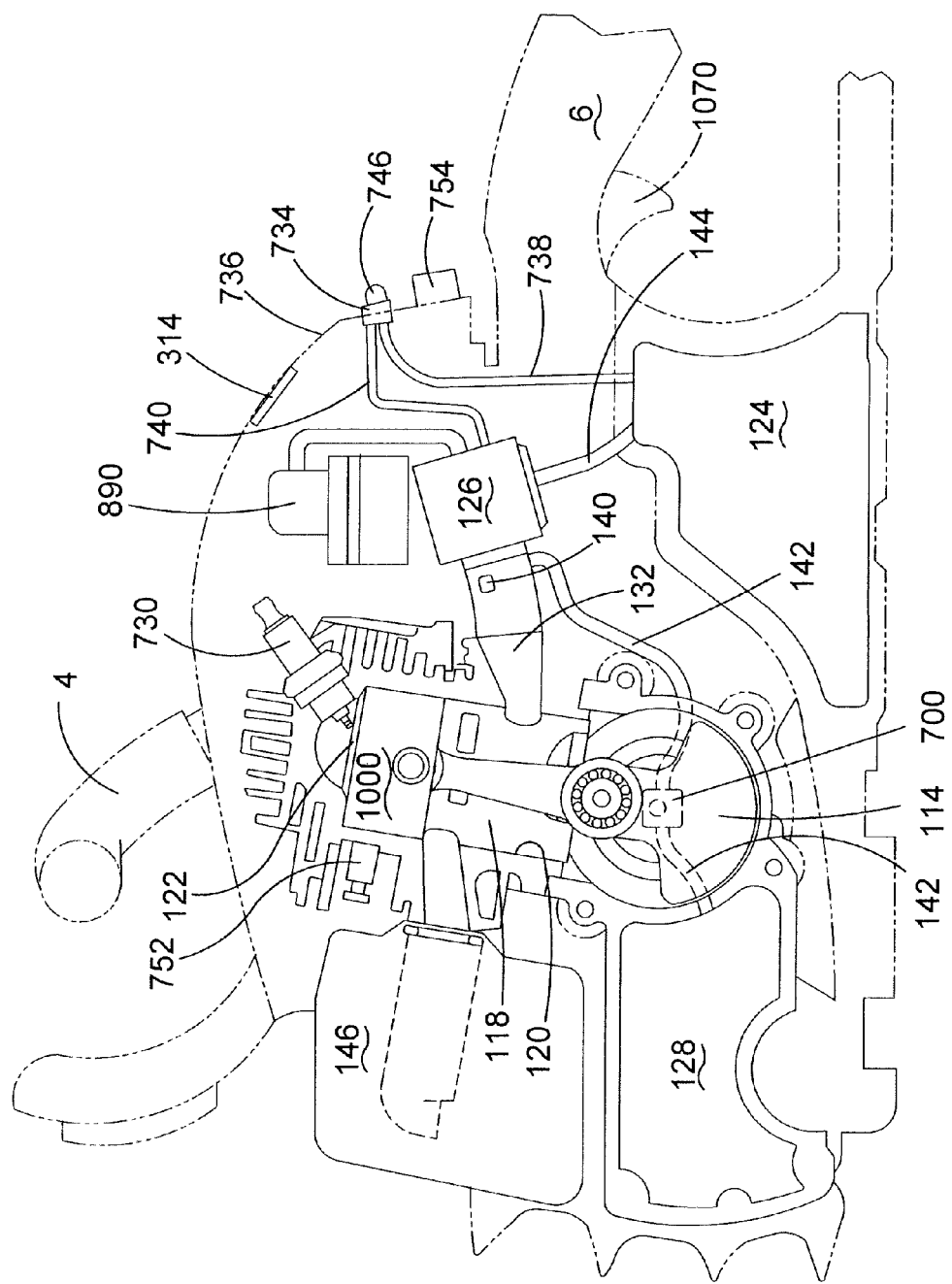
FIG. 33 shows a schematic view of the engine of the power cutter.

Referring to FIG. 33, the two stroke internal combustion engine comprises a cylinder 120 in which is slidably mounted a piston 1000 which is connected to a rotatable crank 114. The reciprocating motion of the piston 100 in the cylinder 120 causes a rotational movement of the crank shaft 114 in well known manner. Movement of the piston is caused by the burning of aerated fuel/oil mixture in the cylinder, the ignition of which is caused by the ignition of a spark plug 730. The engine burns the mixture in well known manner to generate rotary motion of its crank shaft 114, which connects to an output shaft. The exhaust gases are then expelled from the engine through an exhaust 146 to the surrounding atmosphere. The engine is started using a pull cord in well know manner. The speed of the engine is determined by the amount of aerated fuel/oil mixture the carburetor 126 provides to the engine which in turn is dependent on the amount the operator depresses the trigger switch 1070.

The power cutter will comprise a fuel tank 124 in which is located fuel for driving the two stroke internal combustion engine 24. Fuel will pass from the tank 124 via passageway 144 through the carburetor 126 which will mix it with air from an air filter 890, prior to being forwarded to the cylinder 120 where it will be burnt. A second tank 128 will also be mounted in the body as shown in which lubricating oil will be contained. The oil will be pumped out of the tank 128 via an oil pump 700. The oil pump 700 will pump the oil through the oil passageways indicated by lines 142 from the oil tank 128 via the pump 130 into the passageway 132 between the carburetor 126 and the cylinder 120, in a suitable form, for example, as a spray or atomized, which is then mixed with the air/fuel mixture generated by the carburetor 126.

A sensor 140 is mounted within the passageway 132 between the carburetor 126 and cylinder 120. The sensor monitors the amount of oil being added to the fuel/air mixture and sends a signal, via an electric cable 701, indicative of the amount of oil in the passageway 132 back to an electronic controller 716 (see FIG. 34). The electronic controller comprises a signal processor which processes the signal and determines whether it is in accordance with a predetermined parameter or not. If the electronic controller determines that the oil is not being supplied in sufficient amounts, it places the engine in an idle mode or stops it altogether.

Such a sensor can be of a capacitance type whereby the sensor monitors the change in capacitance between two plates, the capacitance being a function of the amount of oil there is in the fuel/air mixture. Such a sensor has been described previously with reference to FIG. 32.

The carburetor 126 will now be described with reference to FIG. 47. The design of the carburetor is similar to that previously described with reference to FIG. 31. Where the same features are present the same reference numbers have been used.

Figure 31:
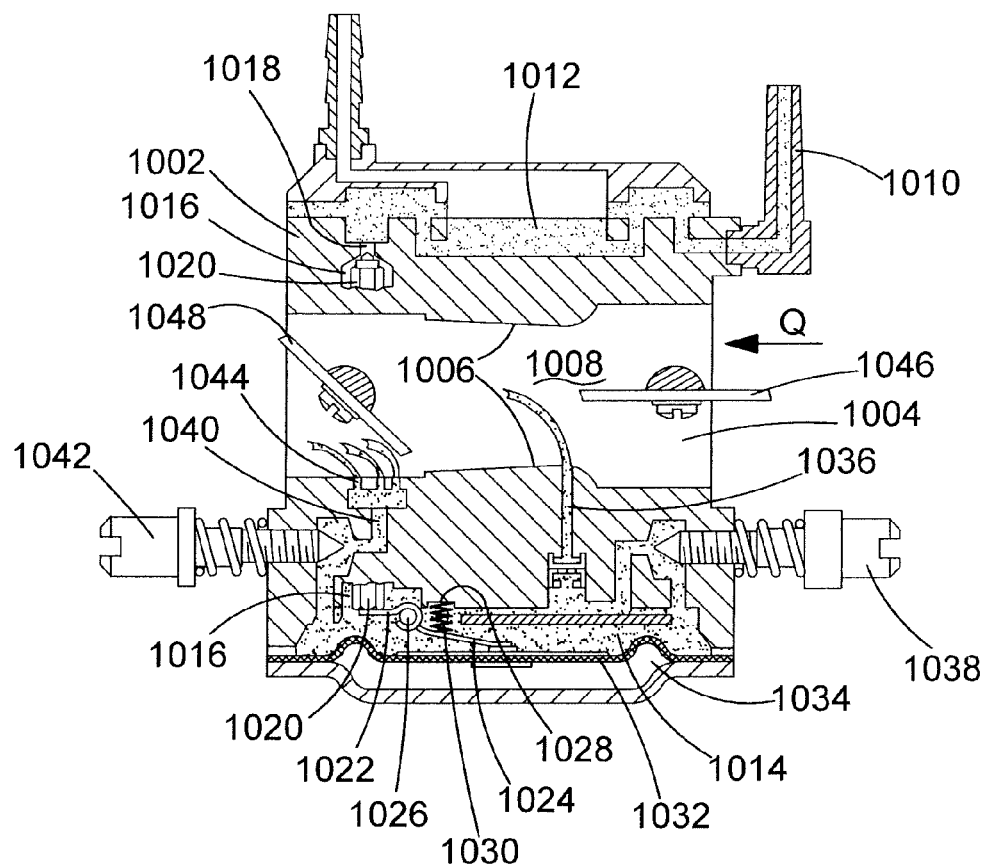
FIG. 31 shows a related design of a carburetor.
Figure 47:
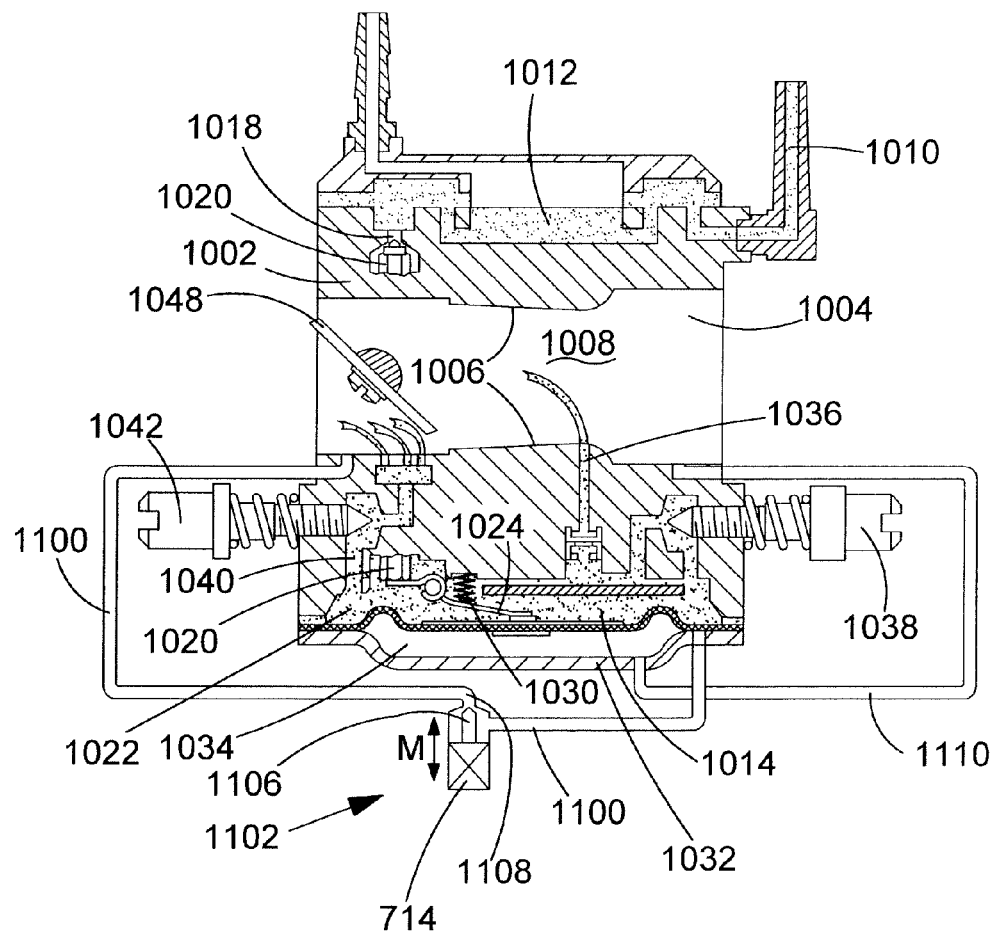
FIG. 47 shows a carburetor with a solenoid.

The main difference between that disclosed in FIG. 31 and that in FIG. 47 is that the first pivotal plate 1046 which acts as the choke for the carburetor has been removed. Instead, a third passageway 1100 has been added. The third passageway 1100 connects to the second chamber 1014 via a solenoid valve 1102. The other end of the third passageway 1100 connects with the air passageway 1004 down stream of the narrow section 1008. The solenoid valve 1102 comprises a solenoid 714 and a pin 1106. The pin can axially slide (Arrow M) between a first position where the tip of the pin 1106 engages with a restriction 1108 in the third passageway 1100 to block the third passageway 1100 and a second position where the tip is located away from the restriction 1108 to open the third passageway 1100. The pin 1106 is biased to its first position. Activation of the solenoid by the provision of an electric current, causes the pin 1106 to move against the biasing force from its first position to its second position opening the third passageway 1100. Deactivation of the solenoid 714 by the removal of an electric current, causes the pin 1106 to move under the influence of the biasing force from its second position to its first position, closing the third passageway 1100.

Under normal operation, the carburetor functions in the same manner as that described with reference to FIG. 31. No current is supplied to the solenoid 714, and the pin 1106 engages with the restriction 1108 and blocks the third passage 1100. However, when the engine is cold, a current can be supplied to the solenoid 714, which causes the pin 1106 to slide away from the restriction, unblocking the third passageway 1100 and allowing fuel to pass through the third passageway 1100 and enter the air passageway 1004. This increases the amount of fuel relative to the amount of air in the aerated fuel exiting the air passageway 1004 to enable the engine to run smoothly whilst it is cold. Once the engine is warm, the solenoid 714 can be switched off by removing the electric current to it, allowing the pin 1106 to slide towards the restriction 1108 to block the third passageway and prevent any further fuel from passing through it.

In addition to the third passageway 1100, there is a fourth passageway 1110 which connects between the hollow chamber 1034 and the air passageway. This passageway provides an air passage between the two. When there are increases or decreases in the air pressure in the air passageway 1004, these are transmitted to the hollow chamber 1034. These in turn are transmitted to the second chamber 1014 via the diaphragm 1032 which influences the flow of fuel into the second chamber and into the air passageway 1004. The fourth passageway 1110 acts as a feed back mechanism to improve performance of the carburetor.

The solenoid is used when the engine is cold to provide an air/fuel mixture which is richer in fuel to help start the engine. When the engine is warm, the solenoid is switched off. The temperature of the engine is measure using a sensor 710 located on the engine block. The solenoid 714 is used to replace the choke on exiting designs of carburetor whereby which an operator would manually adjust the valve to start the engine when it is cold. The electronic controller 716 operates the solenoid dependent on the temperature of the engine.

An alternative design of carburetor which uses a solenoid in a similar manner can be found in U.S. Pat. No. 7,264,230. This could be used to replace that described previously with reference to FIG. 47.

Figure 48:
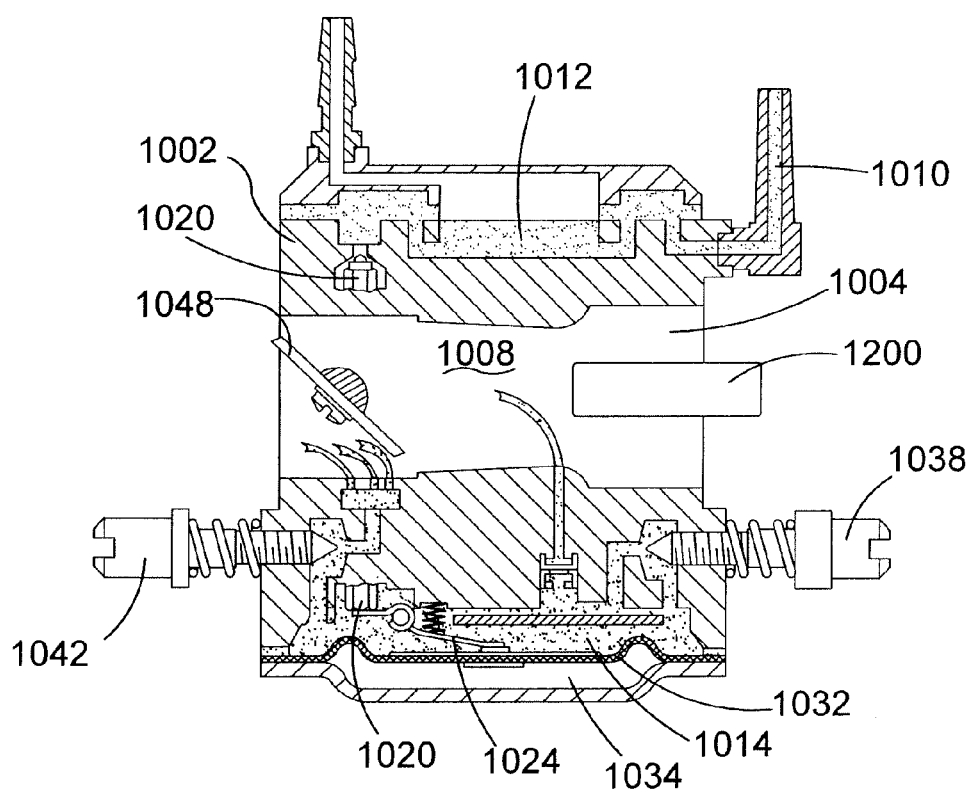
FIG. 48 shows a carburetor with a heating element.

A second alternative design will now be described with reference to FIG. 48. The carburetor 126 will now be described with reference to FIG. 48. The design of the carburetor is similar to that previously described with reference to FIG. 31. Where the same features are present the same reference numbers have been used.

The main difference between that disclosed in FIG. 31 and that in FIG. 47 is that the first pivotal plate 1046 which acts as the choke for the carburetor has been removed and has been replaced by a heating element 1200. When the engine is cold, the heating element 1200 is switched on and heats the air flow as it passes through the carburetor. This provides heated aerated fuel which enables the engine to run smoothly until it has achieved an acceptable running temperature. The heating element 1200 would be controlled by the electronic controller 716. This could be used to replace that described previously.

Figure 34:
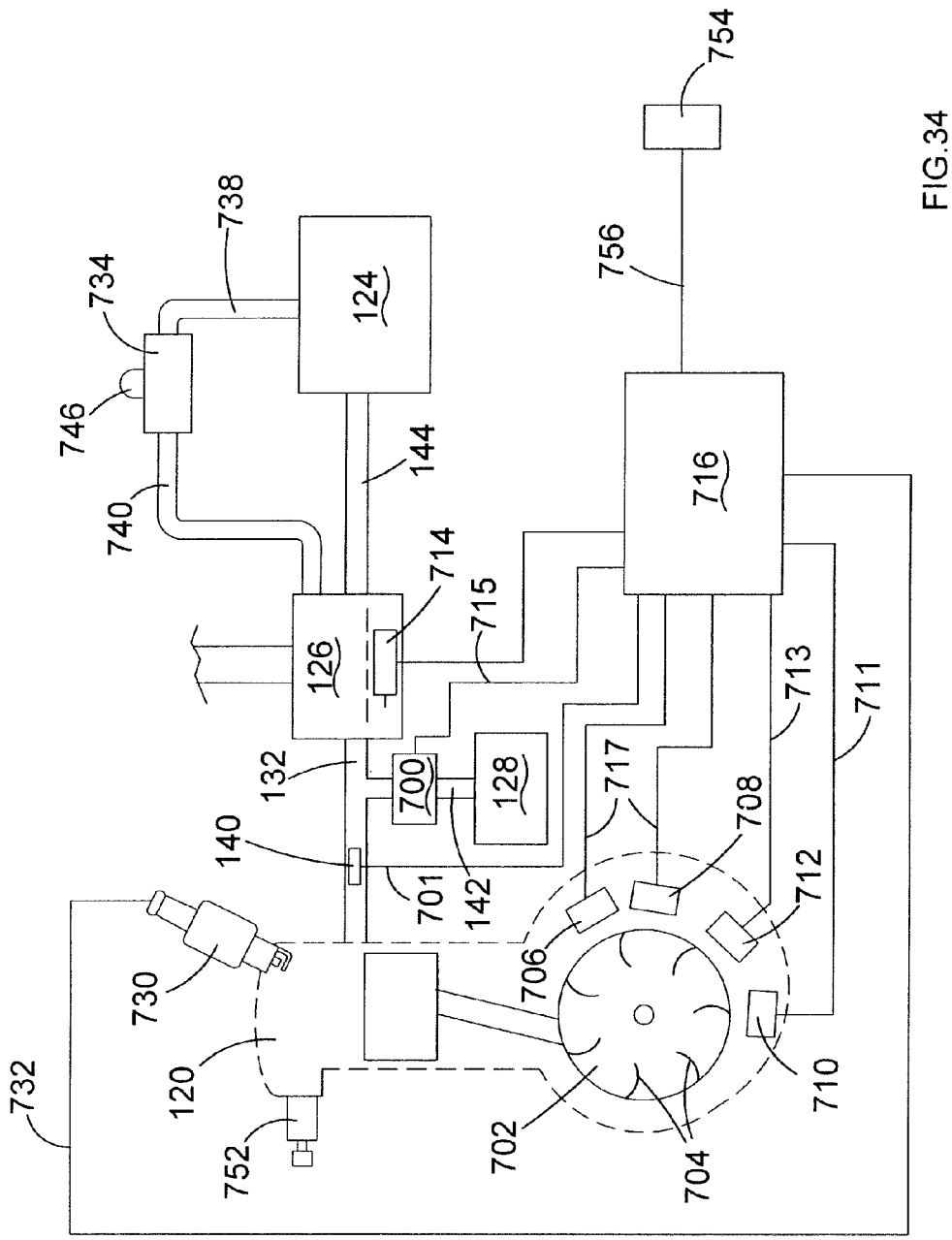
FIG. 34 shows a drawing of the control system for the engine.

The engine ignition system is controlled by an electronic controller 716, the function of which is described in more detail below with reference to FIG. 34.

Mounted on the end of the end of the crank shaft 114 is a fly wheel 702 which contains a number of metal fins 704 which form an impeller. As the fly wheel 702 rotates, the impeller blows air around the out side of the engine. Adjacent the impeller 702 are two generators 706; 708. The two generators generate electricity using magnets and the change of inductance caused by the rotating flywheel 702. As the fly wheel 702 rotates, it causes the two generators 706; 708 to produce electricity. The first generator 706 is used to provide electricity for the ignition system of the engine and the electronic controller 716. The second generator 708 is used to provide electricity for the oil pump 700 and the solenoid 714 in the carburetor. Both are connected to the electronic controller 716 via cables 717.

Also mounted adjacent the flywheel are two sensors 710; 712. The first sensor 710 monitors the temperature of the engine block and sends a signal via an electric cable 711 indicative of the temperature to the electronic controller 716. The second sensor 712 monitors the angular position of the flywheel 702 and sends a signal via an electric cable 713 indicative of the angular position of the flywheel 702 back to the electronic controller 716. This signal can also be used by the electronic controller 716 to determine the rate of rotation of the fly wheel 702, as well as its angular position.

Figure 35:
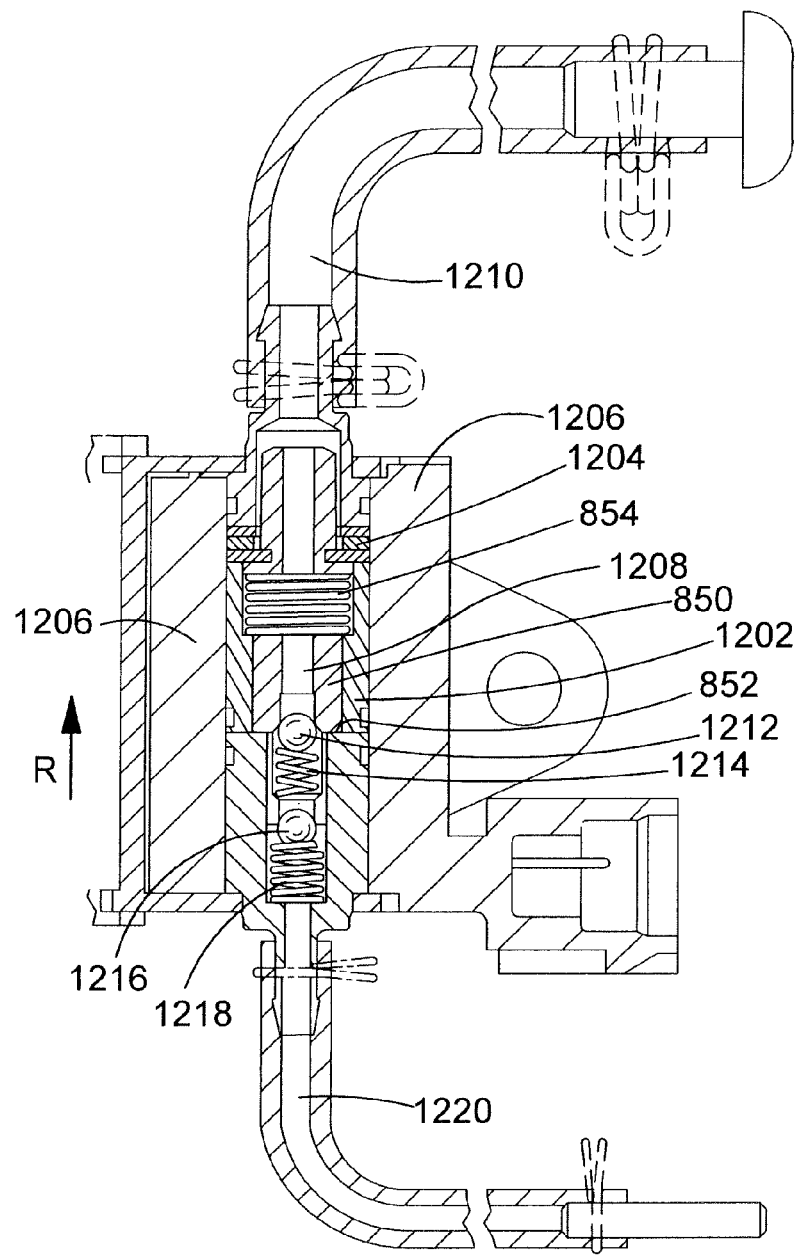
FIG. 35 shows a drawing of the oil pump.
Figure 37:
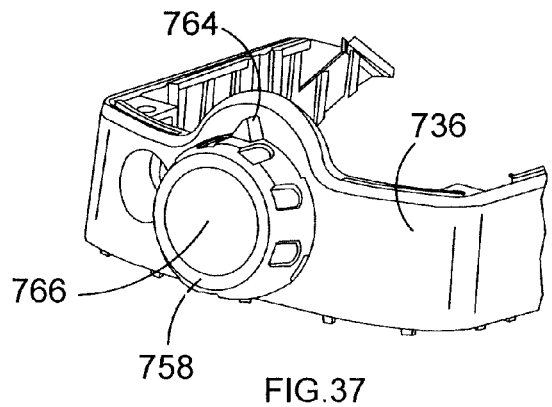
FIG. 37 shows a drawing of the rotatable on/off switch.

The oil pump 700 is an electrically powered oil pump 700, the power for which is supplied by the electronic controller 716 via electric cable 715. The oil pump is shown in FIG. 35.

This type of oil pump is described in EP1236894. Referring to FIG. 35, the oil pump comprises a piston 850 which can axially slide within a housing 1202 over a limit range of axial movement which is determine by a stop mechanism 1204. A spring 854 biases it to a predetermined position. A chamber 852 is located below the piston 850. A solenoid 1206 surrounds the piston and moves it axially when an electric current is applied. The piston 850 is biased in direction of Arrow R by a spring 854. Activation of the solenoid moves the piston against the biasing force of the spring 854 in the opposite direction to Arrow R. A passageway 1208 is formed through the piston 850. Oil is fed into the passageway via an inlet 1210. A first valve comprising a ball bearing 1212 and spring 1214 is located between the end of the passageway 1208 and the chamber 852. A second valve comprising a ball bearing 1216 and a spring 1218 is located between the base the chamber 852. When the piston is moving in the direction of Arrow R due to the biasing force of the spring 854, enlarging the chamber 852, the first valve opens and the second valve closes, filling the chamber with oil. When the piston is in the opposite direction of Arrow R due to activation of the solenoid 1206, reducing the size the chamber 852, the first valve closes and the second valve opens, expelling the oil from the chamber 852 and through an outlet 1220.

Figure 45A:
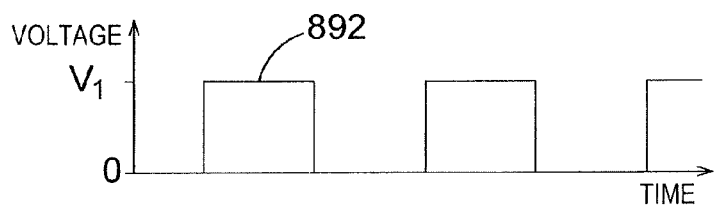
FIGS. 45A and 45B show the electric signal sent to the oil pump from the electronic controller operating at two speeds, a slow speed (FIG. 45A) and a high speed (FIG. 45B)
Figure 45B:
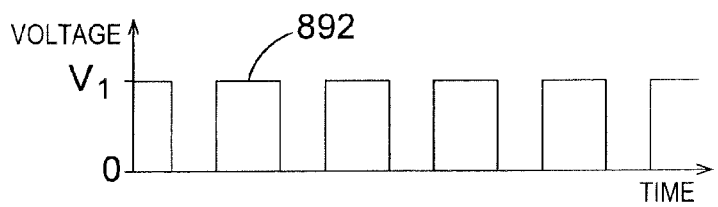

The oil pump 700 is driven by the electronic controller 716 which sends a square shaped voltage signal 892 to the oil pump (see FIG. 45A) When the voltage is at V1, it causes the piston 850 of the pump to move, reducing the size of the oil chamber 852. This causes a preset amount of oil to be pump out of the chamber 852. When voltage is "0", the piston returns to its starting position due to the spring 854, enlarging the chamber 852 and allowing the chamber 852 to fill with oil. The higher the frequency of the square shaped voltage signal 892, the more oil the oil pump 700 pumps per unit of time. The oil pump is capable of running at two speeds (the first speed shown in FIG. 45A, the second speed being shown in FIG. 45B where the frequency of the square shaped voltage signal 892, and hence the movement of the piston 850, is double) and its general operation is described in more detail below.

The spark plug 730 is connected to the electronic controller 716 via a cable 732. Ignition of the spark plug is controlled by the electronic controller 716.

Figure 36:
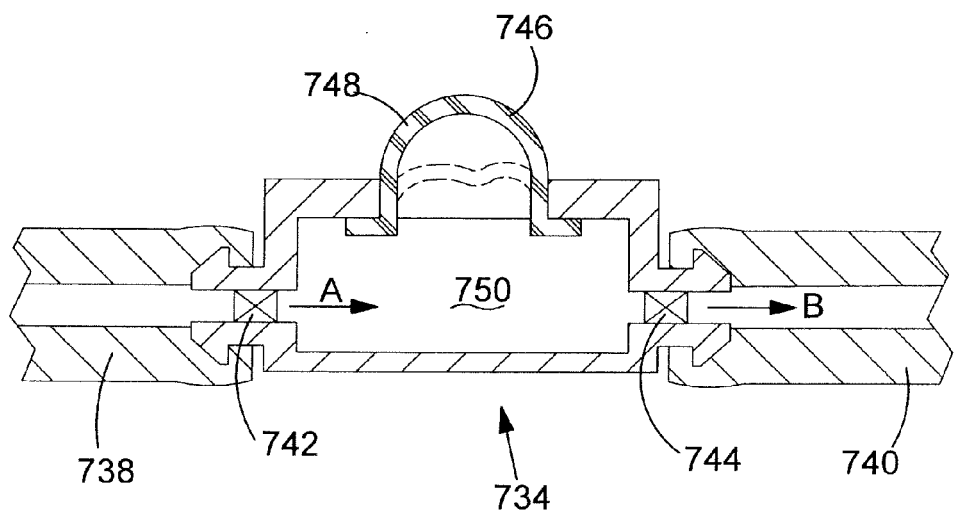
FIG. 36 shows a drawing of the primer.

A primer 734 is mounted on the rear wall 736 of the housing 800 of the power cutter. The primer is a manual pump. A pipe 738 connects from the fuel tank 124 to the primer 734. A second pipe 740 connects from the primer to the carburetor 126. A brief description of the principle of how the primer works will now be described with reference to FIG. 36. The primer consists of two valves 742; 744 located in series which allow the fuel to flow one way through them only (indicated by Arrows A and B). Located between the two valves 742; 744 is a chamber 750 having a rubber dome 746 forming a wall which is accessible to the user of the power cutter. One valve 742 only allowing fuel to enter the chamber 750, the other only allowing fuel to leave the chamber 750. In order to use the primer, the operator, compresses the rubber dome 746 (shown as dashed lines 748). This reduces the amount of volume in the chamber 750 formed between the valves and hence the amount of space which can contain fuel. As such, fuel is ejected from the primer through the one of the valves 744, as the second valve 742 remains closed, preventing fuel from leaving the chamber 750 via that valve 742. When the operator releases the dome 746, the volume of the chamber 750 increases, causing fuel to be sucked into the chamber 750 through the second valve 742 as the first valve remains closed 744 preventing fuel from entering the chamber 750 through that valve 744. Repetitive compressing and releasing of the dome 746 results in the fuel being pumped through the primer 734. The primer is arranged so that the operator can manually pump the fuel from the tank 124 to the carburetor 126 through the pipes 738; 740.

The purpose of the primer is to enable the operator to place fuel into the carburetor. Otherwise the operator has to spin the engine a number of times using the pull cord before a sufficient amount of fuel is sucked through into the carburetor 126.

A DECO valve 752 is mounted on the side of the cylinder 120. The valve 752 is opened manually by the operator prior to starting the engine. When opened, the DECO valve reduces the pressure within the cylinder 120 prior to ignition. This enables the starting of the engine using the pull cord to be made easier as the amount compression of the fuel/air mixture required is reduced. When the engine is started, the DECO valve automatically closes.

The electronic controller 716 has an on/off switch 754 in the form of a rotatable knob 758. The switch is connected to the electronic controller via an electric cable 756.

The knob 758 as a pointer 764 integrally formed on its periphery. The rotatable knob 758 has two angular positions between which it can rotate. In the first position, the switch is ON. In this position, the pointer 764 points to an ON label 762 (see FIG. 1). In the second position, the switch is OFF. In this position, the pointer 764 points to an OFF label 760. When the rotatable knob is in the ON position, the operator can start the engine and use the power cutter. When the rotatable knob 758 is in the OFF position, the engine is prevented from being started. If the rotatable knob 758 is moved from the ON to the OFF position when the engine is running, the engine is automatically switched off.

An operating button 766 is located in the center of the knob 758. If the engine is running (i.e. the knob is in the ON position), depression of the operating button 766 will result in the engine being switched off. The knob 758 then automatically returns to the OFF position. If the knob 758 is prevented from returning to the OFF position after the operating button has been depressed, the engine will not be able to be started until the knob 758 has been allowed to return to the OFF position.

The construction of the assembly for the ON/OFF switch 754, which includes the knob 758 and operating button 766, will now be described.

The ON/OFF switch assembly consists of the rotatable knob 758, a crank 768, a switch cam 770 and the operating button 766.

The crank 768 is rigidly fixed into the rear wall 736 of the housing 800 and prevented from rotation. The crank 768 comprises a socket 772 into which is rigidly mounted a micro switch 774 (see FIG. 49C).

Rotatably mounted on the outside of the crank 768 is the knob 758. Rotatably mounted on the inside of the crank 768 is the switch cam 770. A bolt 778, which passes through the base of a tubular recess 776 formed in the knob 758, screws into the switch cam 770 and is rigidly attached to it. Sandwiched between the head of the bolt 778 and the base of the recess 776 is a spring 780. The bolt 778 and spring 780 hold the knob 758 and switch cam 770 onto the crank 768, biasing them towards each other as the spring biases the head of the bolt 778 away from the base of the recess 776. The knob can rotate through a limited range of movement (between the ON and OFF positions) relative to the crank 768. The range of positions is limited by pegs 786 formed on the underside of the knob engaging with recesses 788 formed in the edge of the rear wall 736 of the housing. The switch cam 770 can also rotate through a limited range of movement relative to the crank 768. In addition, the switch cam 770 can axially slide relative to the crank 768 in a direction parallel to the longitudinal axis of the bolt 778 over a limited range of movement, the range being limited by the length of the bolt 778 within the recess 776. The bolt 778 rotates and slides with the switch cam 770.

Figure 40:
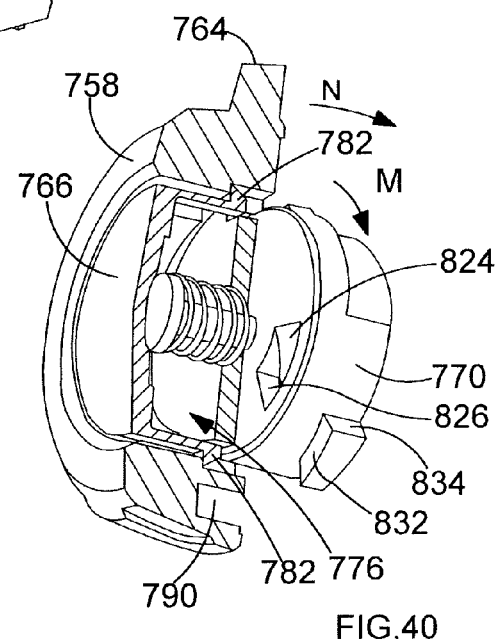
FIG. 40 shows a cut away view of the switch.

The operating button 766 is mounted within the tubular recess 776 formed in the knob 758 and encloses the end of the bolt 778 located in the recess 776 and the spring 780 (see FIG. 40). The operating button 766 can axially slide within the recess 776 towards or away from the switch cam 770. The range of outward axial movement of the operating button is limited by stops 782 each engaging with an inner step of the knob 758. The head of the bolt 778 directly abuts the underside of the operating button 766. Depression of the operating button, causes the bolt 778 to be pushed through the base, compressing the spring 780, moving the switch cam 770 away from the crank 768 and knob 758.

Figure 41:
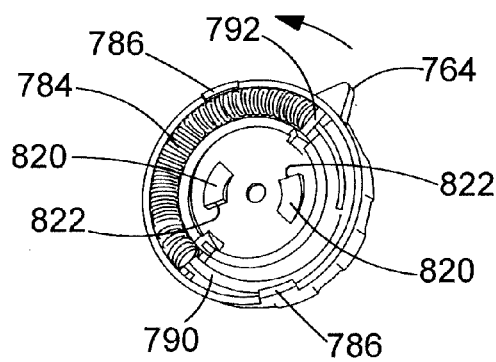
FIG. 41 shows a drawing of the underside of the knob.
Figure 42:
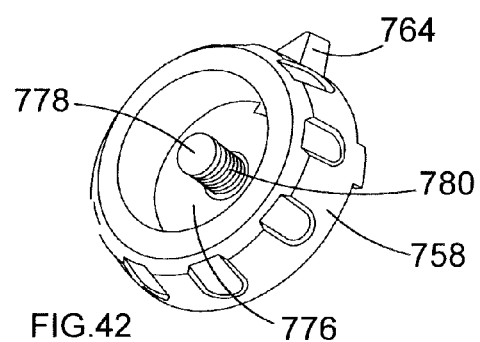
FIG. 42 shows a drawing of the knob, bolt and spring.
Figure 38:
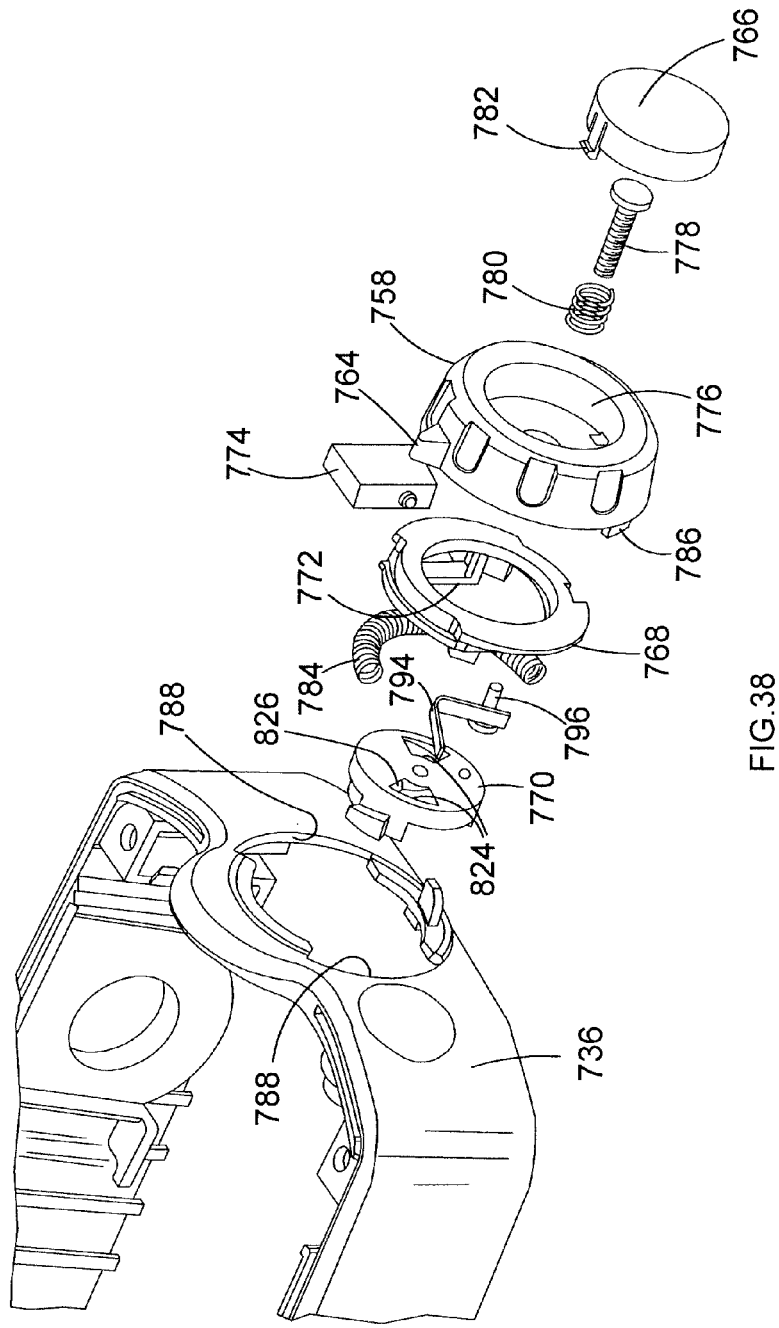
FIG. 38 shows an exploded view of the switch.

Connected between the knob 758 and the crank 768 is a long helical spring 784. The helical spring 784 locates in a circular channel 790 formed on the underside of the knob 758 as best seen in FIG. 41. One end abuts against a wall 792 at the end of the channel 790. The other end abuts against a stop (not shown) formed on the crank 772. The spring 784 rotationally biases the knob 758 relative to the crank to its OFF position.

Figure 43:
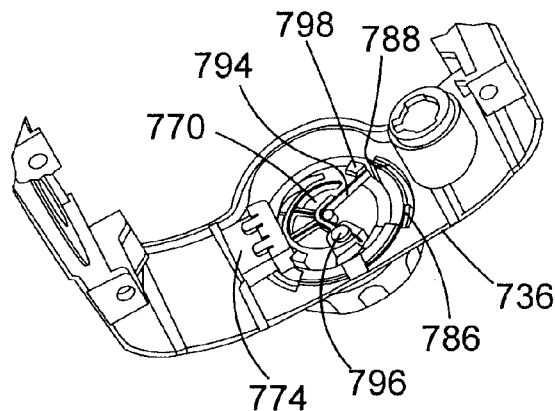
FIGS. 43 and 44 show rear views of the switch.
Figure 44:
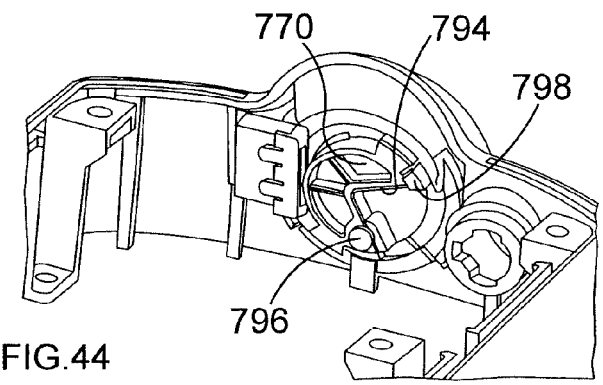

Connected between the switch cam 770 and the crank 768 is a leaf spring 794 as best seen in FIGS. 43 and 44. One end of the leaf spring 794 is connected using a small bolt 796 to the switch cam 770. The other end abuts a stop 798 on the crank 768. The leaf spring 794 rotationally biases the switch cam 770 relative to the crank to an OFF position.

Figure 9:
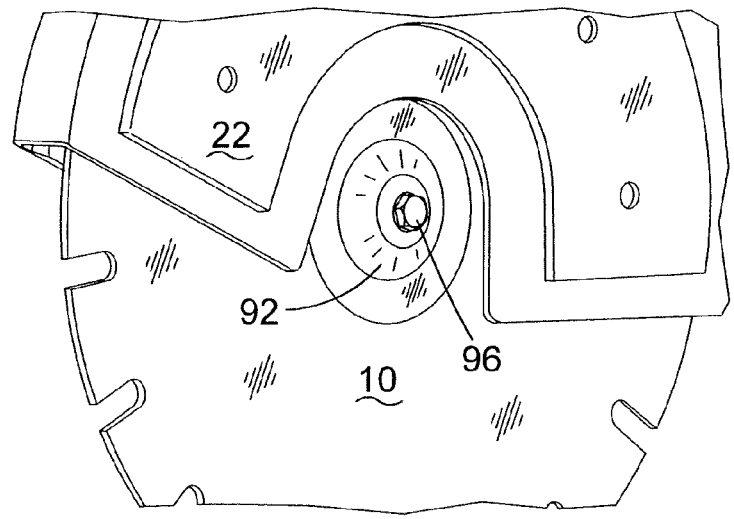
FIG. 9 shows a drawing of a close up the blade and blade guard.

Formed on the underside of the knob 758 are two ramps 820, each ramp having a ramp end 822 as best seen in FIG. 41. Formed on the side of the switch cam 770 which faces the knob 758 are ramp recesses 824 which have ramp recess ends 826 as best seen in FIG. 9. When the switch assembly is in the OFF position i.e. when both the knob 758 and the switch cam 770 in their OFF positions under the biasing force of their respective springs 784; 794, each of the two ramps 820 is located in a corresponding ramp recess 824 with the ramp ends 822 of each ramp 820 abutting directly against the ramp recess ends 826 of the corresponding ramp recess 824.

Figures 39A, 39B, 39C, 39D, 39E:
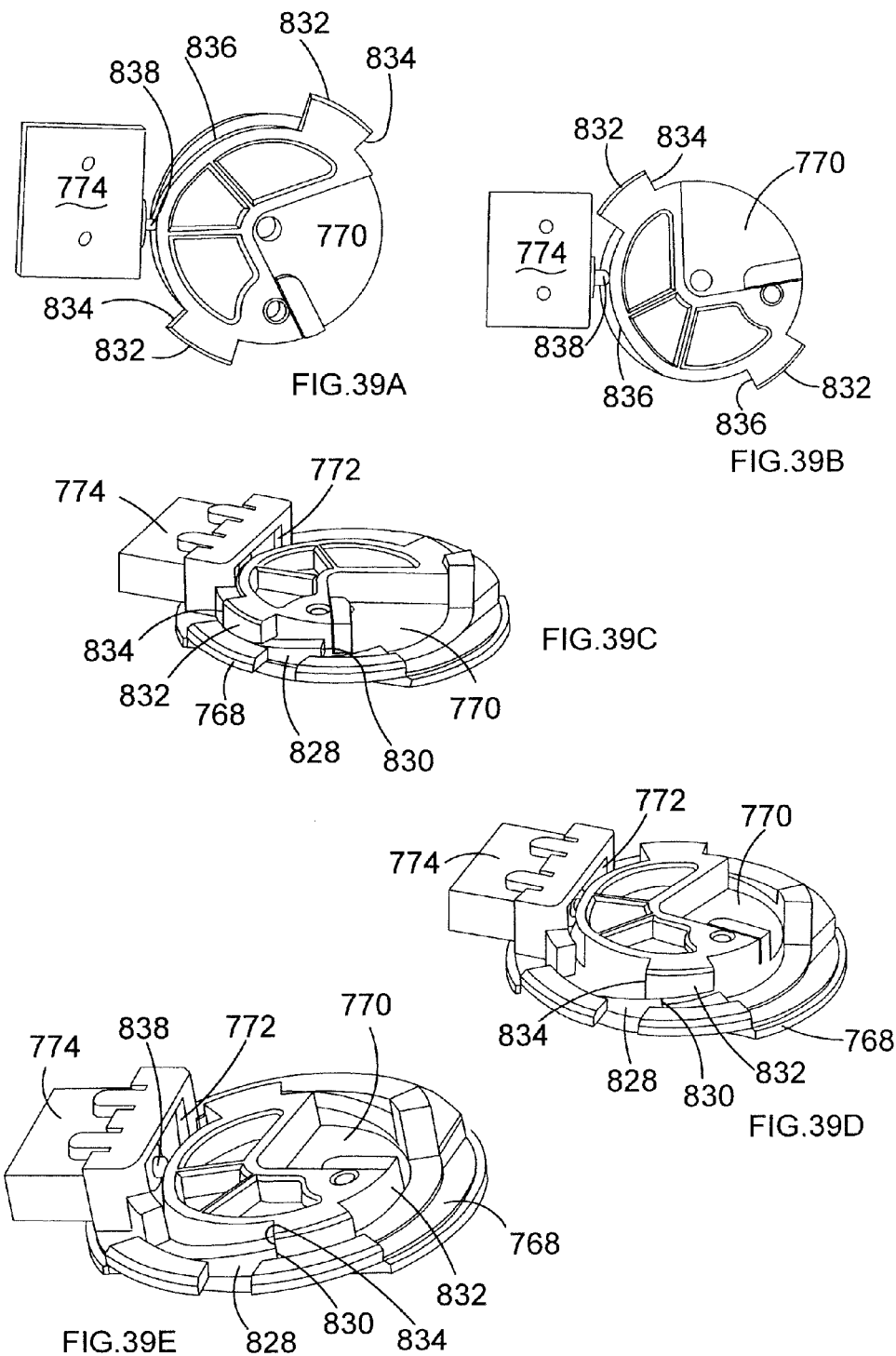
FIG. 39A to 39E show a drawing of the switch cam and micro switch.

Formed on the underside of the crank 768 are two crank ramps 828, each ramp 828 having a crank ramp end 830 as best seen in FIG. 39C. Formed on the side of the switch cam 770 which faces the knob 758 are switch cam crank ramps 832 which have switch cam crank ramp ends 834 as best seen in FIG. 40. When the switch assembly is in the OFF position i.e. with both the knob and the switch cam 770 in their OFF positions under the biasing force of their respective springs 784; 794, each of the two switch cam crank ramps 832 are located against the low end (the end of the crank ramp 828 away from the crank ramp end 830) of the corresponding crank ramp 828 as shown in FIG. 39C.

Figure 8:
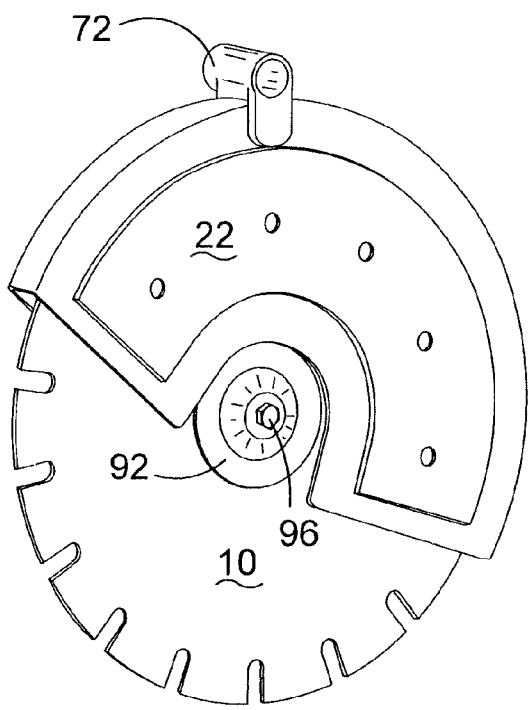
FIG. 8 shows a drawing of the blade and blade guard from the opposite direction to that shown in FIG. 7.

Formed around the edge of the switch cam 770 is a peripheral cam 836 as best seen in FIGS. 39A and 39B. The micro switch 774 comprises a pin 838 which projects from the body of the micro switch 774. The pin 838 is capable of sliding axially in or out of the body of the micro switch 774 and biased to its outer most position by a spring (not shown) inside the micro switch 774. The pin 838 engages the peripheral cam 836. Rotation of the switch cam 770 causes the pin 838 to slide along the peripheral cam 836, which causes it to be pushed into the body of the micro switch 774 against the biasing force of the spring, or allows it to slide out of the body of the micro switch 774 under influence of the spring. When the switch cam 770 is in its OFF position, the pin is pushed into the body of the micro switch 774 as shown in FIG. 8A. When switch cam is rotated to its ON position, the pin 838 extends to its outer most position as shown in FIG. 39B.

The way the assembly for the ON/OFF switch works will now be described.

Initially, the knob 758 and the switch cam 770 are both located in their OFF positions. The operator of the power cutter desires to turn the unit on using the ON/OFF switch. The operator uses their hand to rotate the knob 758 from its OFF position to its ON position. When the knob 758 is rotated, it causes the cam switch 770 to rotate in unison as the rotary movement is transferred from the knob 758 to switch cam 770 by the ramp ends 822 of each ramp 820 pushing the ramp recess ends 826 of each corresponding ramp recess 824, against which it abuts, in the direction of Arrow M in FIG. 40, to cause the switch cam 770 to rotate with the knob 758. As the switch cam 770 rotates, the two switch cam crank ramps 832, which are initially located against the low end of the crank ramps 828 (shown in FIG. 39C), ride up the crank ramps 828 (shown in FIG. 39D), which are stationary. As the switch cam crank ramps 832 ride up the crank ramps 828 due to the rotation of the switch cam 770, the switch cam 770 is forced to axially slide away from the knob 758 (direction of Arrow N in FIG. 40), causing the spring 780 to be compressed and the head of the bolt 778 to move towards the base of the recess 776. When the switch cam has rotated sufficiently that the crank ramp ends 830 and the switch cam crank ramp ends 834 become aligned, the switch cam 770 axially slides under the biasing force of the spring 780 towards the knob 758, ensuring that the crank ramp end 830 and the switch cam crank ramp ends 834 abut against each other as shown in FIG. 39E. When the crank ramp ends 830 and the switch cam crank ramp ends 834 abut each other as shown in FIG. 39E, the switch cam 770 is in its ON position and is prevented from returning to its OFF position, under the influence of the leaf spring 794, as the crank ramp ends 830 and the switch cam crank ramp ends 834 prevent relative movement as they are jammed against each other. The knob 758 is prevented from returning to its OFF position under the influence of the spring 784 by the ramps 820 being held within the ramp recesses 824 by the action of the spring 780 which overrides the spring 784. When the switch cam 770 rotates from the OFF position (see FIG. 39A) to the ON position (FIG. 39B), the peripheral cam 836 rotates, which in turn allows the pin 838 to extend from the body of the micro switch 774. This in turn makes a connection which allows the electric controller 716 to activate the power cutter and allow it to start when the pull cord is pulled.

As such, the assembly of the ON/OFF switch is now ON with the knob 758 and the switch cam 770 both in their ON positions, allowing the pin 838 to extend from the body of the micro switch 774. There are two way of switching the ON/OFF switch assembly to its OFF position.

The first method comprises the depression of the operating button 766. Depression of the operating button 766 causes the head of the bolt 778 to slide towards the base of the recess 776 of the knob 758, compressing the spring 780, which in turn causes the switch cam 770 to axially slide away from the knob 758. As the switch cam 770 axially slides, the switch cam 770 moves away from the crank 768, which in turn causes the crank ramps 828 and the switch cam crank ramps 832 to move away from each other, and thus causes the crank ramp ends 830 and the switch cam crank ramp ends 834 to disengage. As such, the switch cam 770 can now rotate back to its OFF position under the influence of the leaf spring 794. As the knob is held in its ON position by the ramps 820 being held within the ramp recesses 824, the knob 858 will also return to its OFF position as the ramp recesses 824 rotate with the switch cam 770. Should the ramps 820 become disengaged from the ramp recesses 824 due to the sliding movement of the switch cam 770 relative to the knob 758, the knob 758 will return to its OFF position under the influence of the spring 784 between the knob 758 and the crank 768.

The second method of switching the ON/OFF switch assembly OFF comprises the rotation of the knob 758. The operator rotates the knob 758 to its OFF position. As the ramps 820 are held within the ramp recesses 824, rotation of the knob 758 urges rotation of the switch cam 770. However, the switch cam 770 is prevented from rotating as the crank ramp ends 830 and the switch cam crank ramp ends 834 abut each other. Therefore, the ramps 820 slide out of the ramp recesses 824, the ramp ends 822 moving away from ramp recess ends 826. As the ramps 820 slide out of the ramp recesses 824, the switch cam 770, which is prevented from rotating, axially slides away from the knob 858 by the caming action of the ramps 820 and ramp recesses 824. When the switch cam 770 has slid sufficiently far enough away from the knob 758, the crank ramp ends 830 and the switch cam crank ramp ends 834, which are sliding away from each other, become disengaged. Thus the switch cam 770 can rotate under the influence of the leaf spring 794 to its OFF position. The knob 758 will move under the influence of the operator and/or the spring 784. As such, both the knob 758 and the switch cam 770 return to their OFF position where they are held by the springs 784; 794.

When both the knob and switch cam 770 moved to their OFF positions, the ramps 820 engage with the ramp recesses 824 so that the switch can be used again to switch on the power cutter.

The operation of the power cutter will now be described.

The operator first activates the DECO valve 752 and then pumps some fuel into the carburetor 126 using the primer 734. The operator then switches the ON/OFF switch to ON by rotation of the knob 758 to its ON position. The operator then pulls the pull cord to rotate the crank 114 of the engine. As the crank 114 rotates, the fly wheel 702 also rotates causing the two generators 706; 708 to produce sufficient electricity to operate the power cutter.

The electronic controller checks the temperature of the engine using sensor 710. If the engine is cold, it uses the electricity from the second generator 708 to power the solenoid 714 in the carburetor to set the "automatic choke". The second generator 708 is not powerful enough to power both the oil pump 700 and solenoid 714 at the same time. Therefore, when the electronic controller 716 is operating the solenoid 714, it switches off the oil pump 700. It has been found that the period during which lubricating oil is not required before the engine is damaged is greater than that required to heat up the engine.

The electronic controller supplies the power to the spark plug to cause combustion in the engine, the power being provided by the first generator 706, the timing being determine by the electronic controller 716 based on the signal provided by the sensor 712 in relation to the angular position of the fly wheel 702.

Once the engine commences firing, the DECO valve automatically closes. The electronic controller 716 continues to monitor the engine temperature and when it has reached a predetermine temperature, the electronic controller 716 switches the solenoid 714 in the carburetor 126 off. The electronic controller 716 then commences supplying a square shape voltage signal to the oil pump to commence pumping oil. The electronic controller monitors the speed of the engine using the signal provided by the sensor 712 monitoring the angular position of the fly wheel 702 to calculate the rotational speed. If the rotational speed is below a predetermined value, the electronic controller 716 sends a signal (FIG. 35A) to the oil pump 700 to cause it to pump at a slow speed. If the rotational speed is above a predetermined value, the electronic controller 716 sends a signal (FIG. 35B) to the oil pump 700 to cause it to pump at a higher speed. The speed of the engine is dependent on the operator squeezing a trigger switch which connects to the carburetor via a cable.

Whilst the engine is running the electronic controller 716 monitors the oil being added to the fuel/air mixture using the sensor 140. If the sensor 140 sends a signal that indicates that the rate of flow of the oil being pumped by the oil pump 700 has dropped below a predetermine amount (e.g. there is a blockage in the oil pipe 142 or the tank 128 is empty), the electronic controller places the engine into an idle mode using the ignition system so that the engine runs, but at a minimal rate.

The engine controller can place the engine in idle mode by altering the timing of the ignition of the spark plug relative to the angular position of the crank shaft or the number of ignitions of the spark plug relative to the number of rotations of the crank shaft. The engine controller can ignite the spark ever two or three rotations of the crank shaft, for example, providing only a half or a third of the power than if the spark plug was ignited every rotation, as would be the case during the normal operation of the engine.

The operator cannot speed up the engine using the trigger switch 1070 until the sensor 140 detects the flow of oil. This protects the engine from damage due to a lack of lubrication. It has been found that the engine can run in idle mode for a considerable period of time before damage to the engine results.

It will be appreciated by the reader that, as an alternative to placing the engine in an idle mode, it could switch it off completely. In such a case, the electronic controller 716 would ensure it could not be started until oil was detected again by the sensor.

In order for the operator to stop the power cutter, the operator either depresses the operating button 766 or rotates the knob 758 to its OFF position.

An alternative system for sensing whether oil is being provided to the aerated fuel to that described previously will now be described. In the alternative design, it is intended to remove the sensor 140 and, instead, monitor the current being supplied to the oil pump 700 when it is running to determine if oil is being pumped by the oil pump.

Figure 46A:
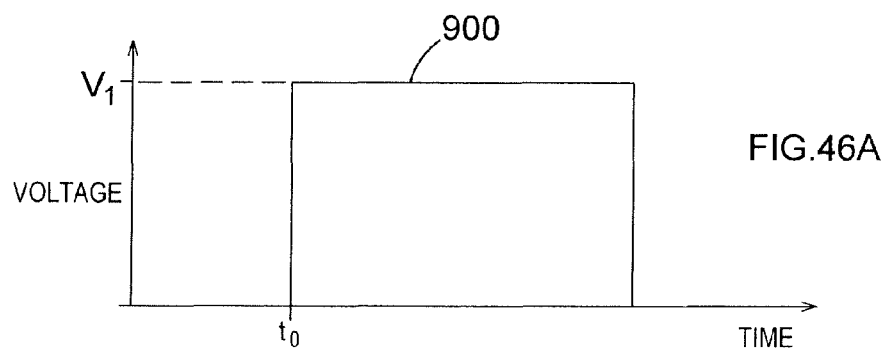
FIGS. 46A, 46B and 46C show the electric signals sent to the oil pump from the electronic controller for the second embodiment of the sensing mechanism.
Figure 46B:
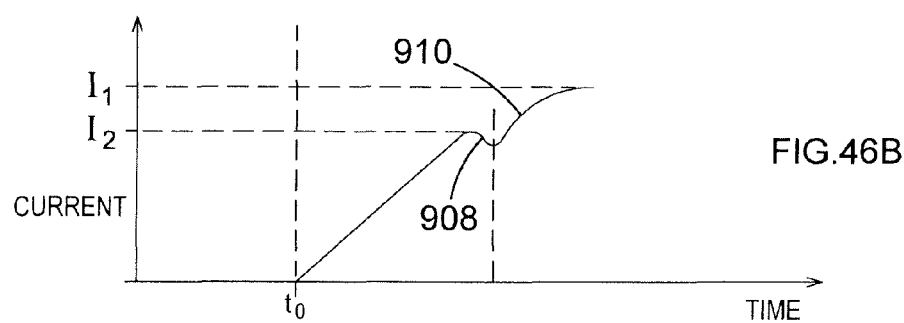
Figure 46C:
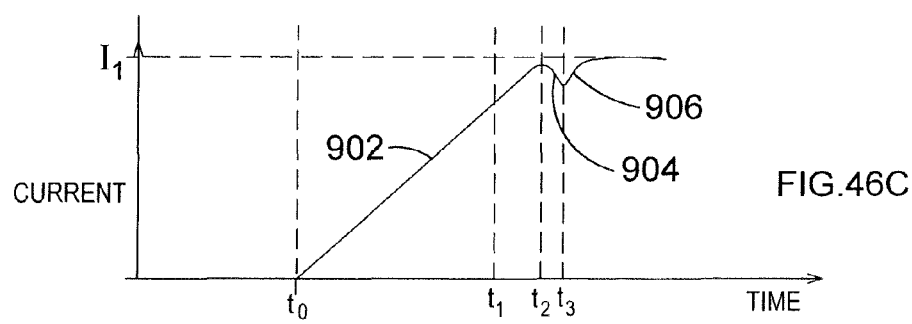

Referring to FIGS. 46A, 46B and 46C, FIG. 46A shows the voltage supplied to the oil pump 700, FIG. 46B shows the current supplied to the oil pump 700 when the oil pump is pumping but there is no oil being pumped, and FIG. 46C shows the he current supplied to the oil pump when the oil pump is pumping oil. The oil pump 700 running at the slow speed.

A square wave voltage V1 indicated by line 900 is supplied to the oil pump as shown in FIG. 46A. When oil is being pumped through the oil pump 700 (FIG. 46C), the current indicated by line 902 starts to rise from zero at t0, when the voltage applied rises to V1 and increases towards I1. When it reaches I1 the amount of current drops 904 before increasing 906 again to I1. The current drops after t2 seconds before beginning to rise again at t3 seconds. The drop in current occurs when the piston 850 in the oil pump 700 reaches its maximum amount of travel due to the solenoid 1206 and then bounces back slightly due to the piston's 850 impact at its maximum distance of travel. However, when no oil is being pumped by the oil pump 700, but the pump is still operating, the speed of travel of the piston 850 in the oil pump increases as there is less resistance. As such it reaches its maximum amount of travel sooner. Therefore, as shown in FIG. 46B, it reaches a lower value of current I2 before the value of current drops 908 and then rises 910 again towards I1. Furthermore, it only takes less time before the current drops 908 and rises 910 again than if the oil pump 700 was pumping oil. The signal processor in the electronic controller 716 can monitor when the current begins to drop versus the start of the voltage pulse and the value of the current at this point to determine whether the pump is pumping oil or not. If t is not, the electronic controller can place the engine in idle mode.

The construction of the fuel cap will now be described with reference to FIGS. 20 to 23.

The fuel tank 124 will be mounted within the body of the unit as generally indicated in FIG. 19. The tank 124 will be sealed by a fuel cap 13 as shown on FIG. 2.

The fuel cap will comprise an inner cap 202, a clutch 204 and an outer cap 206. The inner cap is of a tubular construction with one end 210 being sealed. Formed on the inside surface of a side wall 212 is a thread 208. When the fuel cap is screwed onto the fuel tank, the thread 208 slidingly engages with a thread formed around the external surface of the neck of the fuel tank 124.

Located inside the inner cap 202 adjacent the end 210 is a seal 214. When the fuel cap is screwed onto the fuel tank, the seal 214 ensures that no fuel can escape from the tank. The inner cap 2 locates within the outer cap 206. Sandwiched between the two is the clutch 204. A clip 216 locates within a groove 218 of the inner cap and also engages with an inner groove 220 formed within the outer cap. The clip holds the inner cap inside the outer cap whilst allowing it to freely rotate within the outer cap 206. The inner cap comprises a number of teeth 222 integrally formed with the inner cap. The teeth locate within corresponding slots 224 formed within the clutch, thus rotation of the inner cap causes rotation of the clutch 204. Formed on the clutch 204 are a plurality of resilient arms 226 mounted on the ends of which are pegs 228. The pegs 228 face towards the internal end wall 230 of the outer cap. Formed on the wall are a plurality of ridges 232. The pegs on the clutch are arranged to co-operate with the ridges 232 in the outer cap.

Rotation of the outer cap 206 causes the ridges 232 to engage with the pegs 228 resulting in rotation of the clutch 204, which in turn rotates the inner cap 202 via the teeth 222. When the fuel cap is screwed onto the fuel tank, the inner cap 202 threadingly engages with the neck of the fuel tank, the rotation of the inner cap 202 being caused by rotation of the outer cap 6 via an operator rotating it using a finger grip 234. When the seal 214 located within the inner cap engages with the end of the neck of the fuel tank, the inner cap 202 is prevented from further rotation. This in turn prevents further rotation of the clutch 204. However as the operator continues to exert a rotational force on the outer cap 206, the ridges 232 are caused to ride over the pegs 228, the movement of the pegs 228 being allowed by the resilient arms 226 upon which they are mounted. In this way the operator can rotate the outer cap whilst the inner cap remains stationary thus preventing the operator from over-tightening the fuel cap onto the neck of the fuel tank.

The air filtration mechanism for any of the carburetors 126 previously described will now be described.

The two stroke engine comprises a carburetor 126 which mixes liquid fuel with air to generate a combustible mixture for powering the engine. However, due to the operation of the power cutter, a large amount of dust is generated which mixes with the surrounding air. This results in dust laden air. In order to ensure that the air entering the carburetor is free from dust it must pass through a filter system to remove the dust.

The filter system will now be described with reference to FIGS. 23 to 29.

Inside the body 2 is a filter unit 316 comprising a plastic base 318 and filter paper 320 folded to form pleats. The filter unit 316 is located within the body 2 so that the pleats 320 hang vertically downwards when the power cutter is in a storage position as shown in FIGS. 1 and 2.

Air will be sucked through the filter system by the carburetor 126. Air enters slots 314 on the rear of the body 2. Air passes (Arrow G) to a space 322 underneath the filter unit 316 and then passes through the filter paper 320 to a space 324 above the filter unit 316. Any dust entrained within the air is trapped by the filter unit 316 and held within the pleats of the filter paper 320.

The clean air then passes from the space 324, through a hose 326 to the carburetor 126 located below the space 322 below the filter unit 316.

In order to enable the operator to remove the dust trapped within the pleats of the filter paper 320, a cleaning device is provided. The cleaning device comprises a rubber flap 328, mounted on the top of a plastic base 330, a brush 332 attached to the bottom of the plastic base 330, a handle 334 attached to the plastic base 330 via to rigid arms 338. The base 330 can slide within the space 322 below the filter unit 316, widthways across the body 2. Movement is caused by the operator pulling the handle 334 away from the side of the body 2. Two springs 336 bias the handle 334 towards the side of the body 2.

In order to clean the filter unit, the operator pulls the handle 334, to move the base 330 across the width of the body 2 in the direction of Arrow H, and then releases it to allow it to return in the opposite direction under the biasing force of the springs 336.

Figure 25:
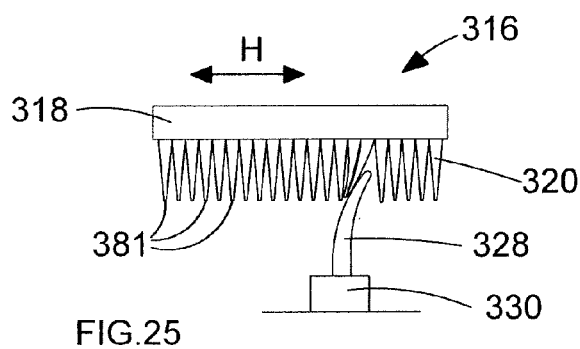
FIGS. 25 and 26 show the cleaning action of the filter.

As the base 330 slides across the width, the rubber flap 328 engage with the pleats 320, as best seen in FIG. 25, knocking the dust of the pleats 320. The dust drops to the base 340 of the space 322 below the filter unit 316.

The brush 332 slidingly engages with the base 340 of the space 322. The brush 332 brushes the dust to one side or the other, depending on the direction of movement. An aperture 344 is formed on one side of the body 2. As the brush approaches the side of the body, it pushes the dust being swept along the base through the apertures, expelling it from the body 2.

Figure 26:
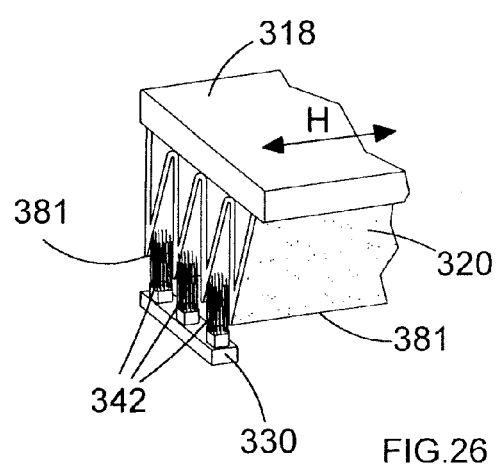
Figure 24:
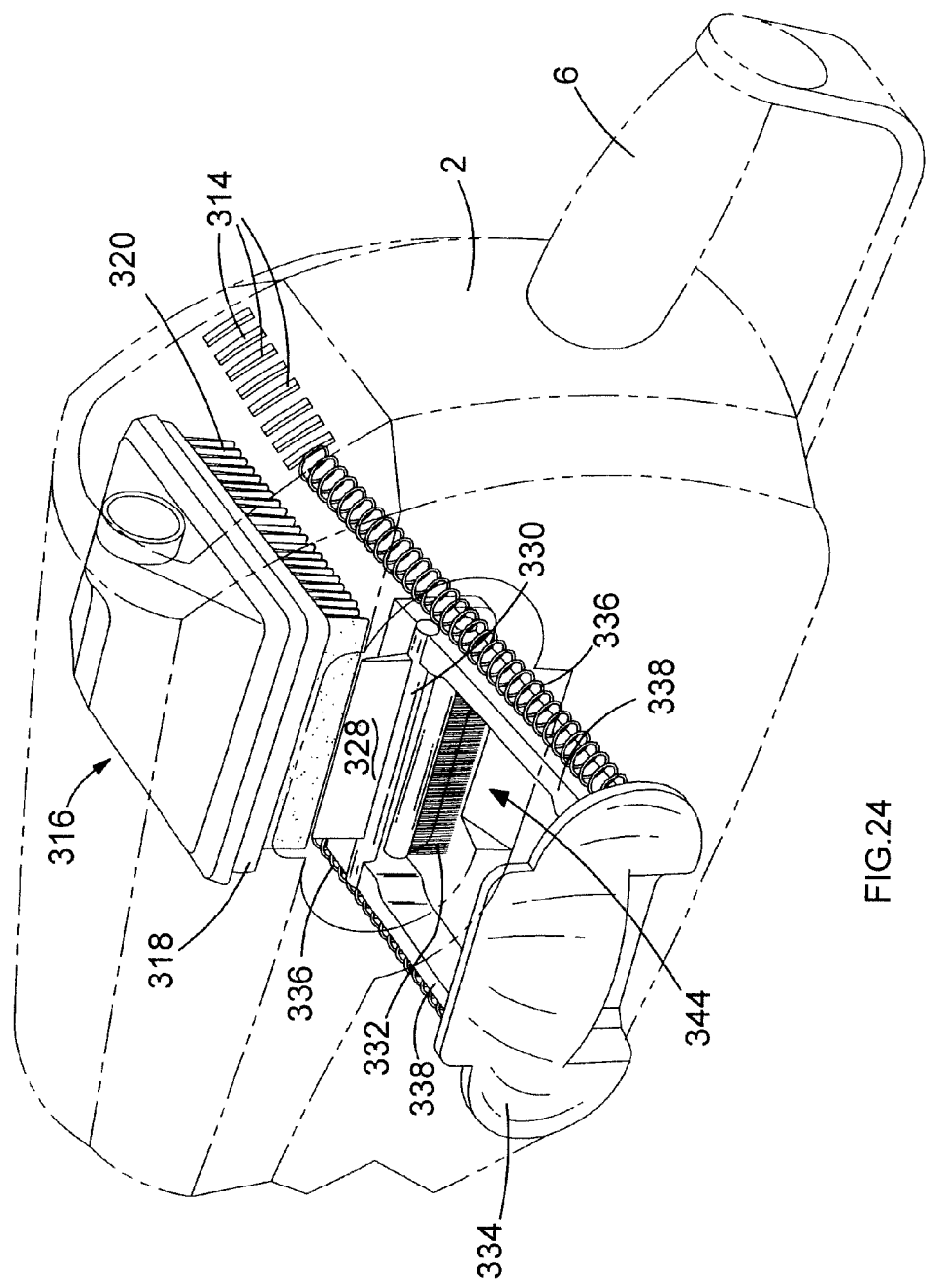
FIG. 24 shows a drawing of the filter.
Figure 27:
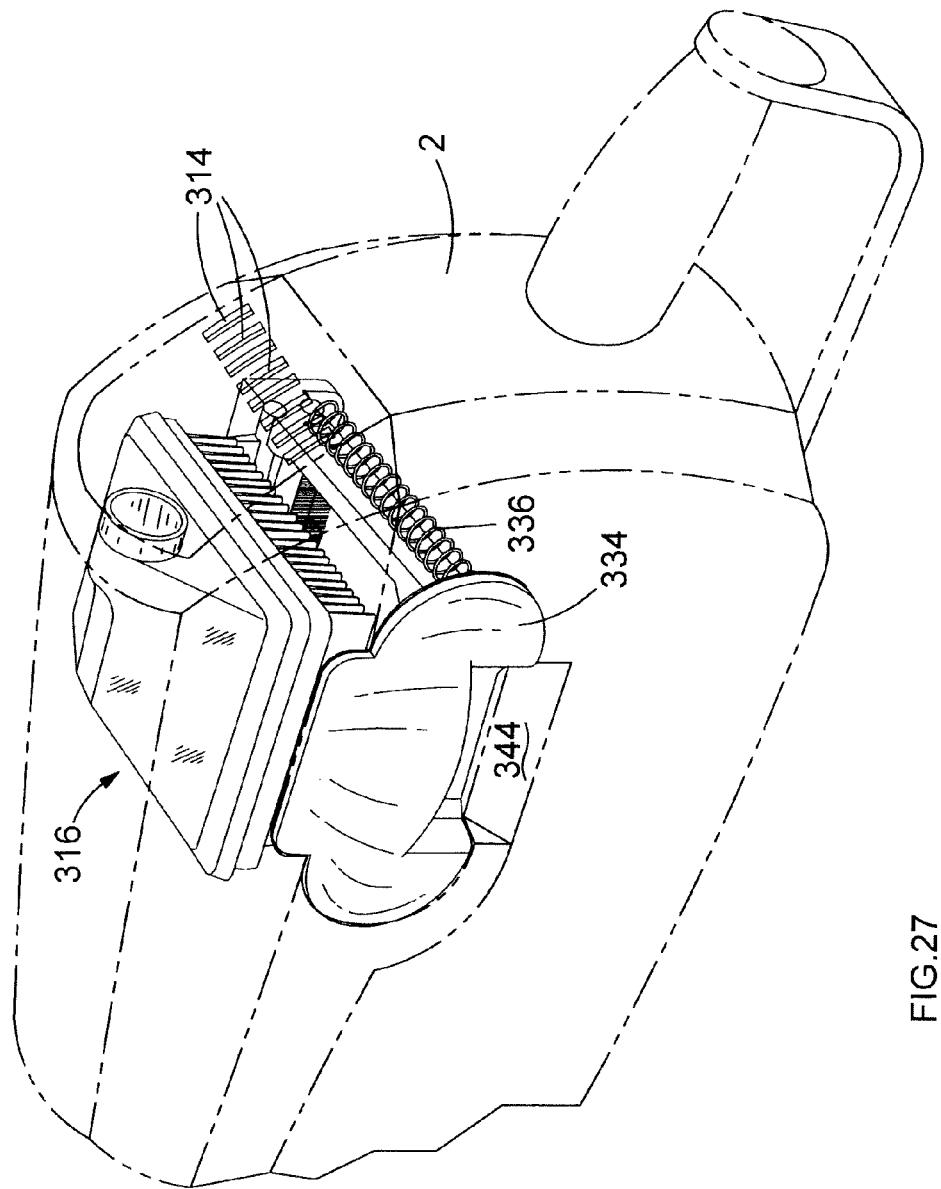
FIGS. 27 to 29 show more drawings of the filter.
Figure 28:
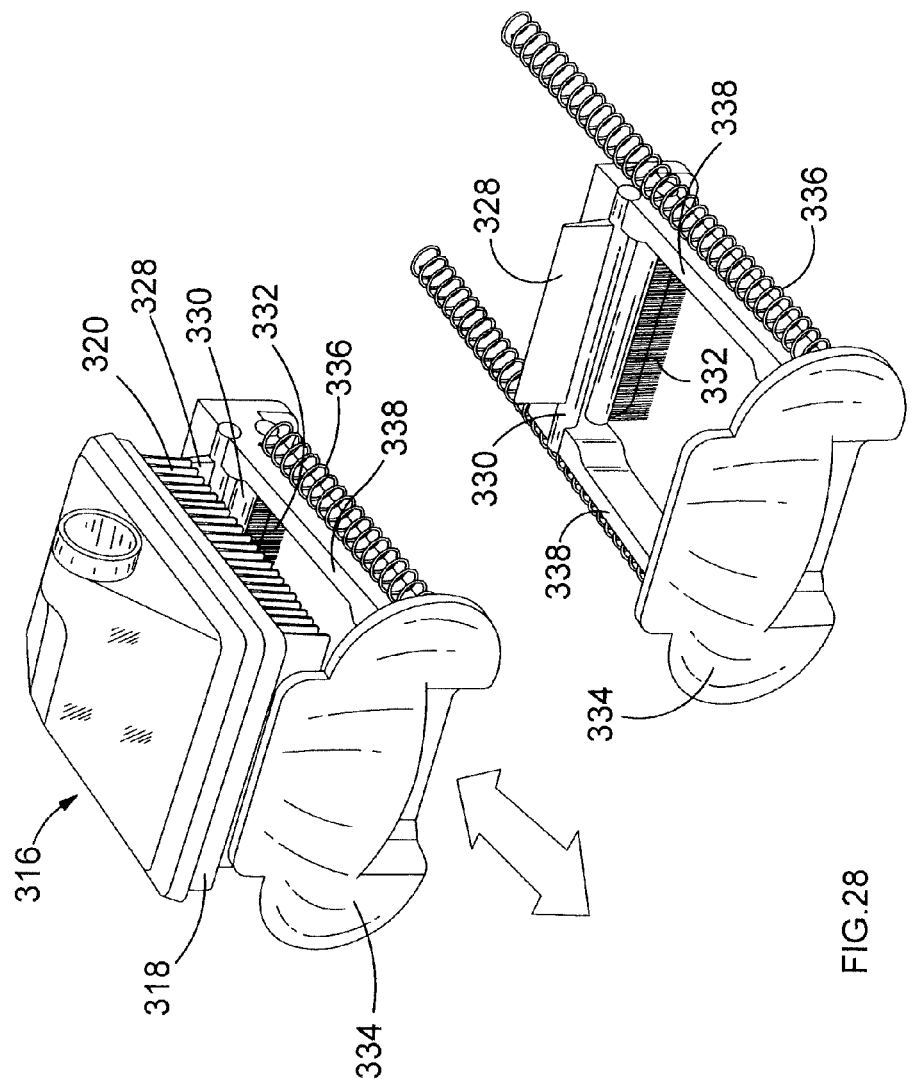
Figure 29:
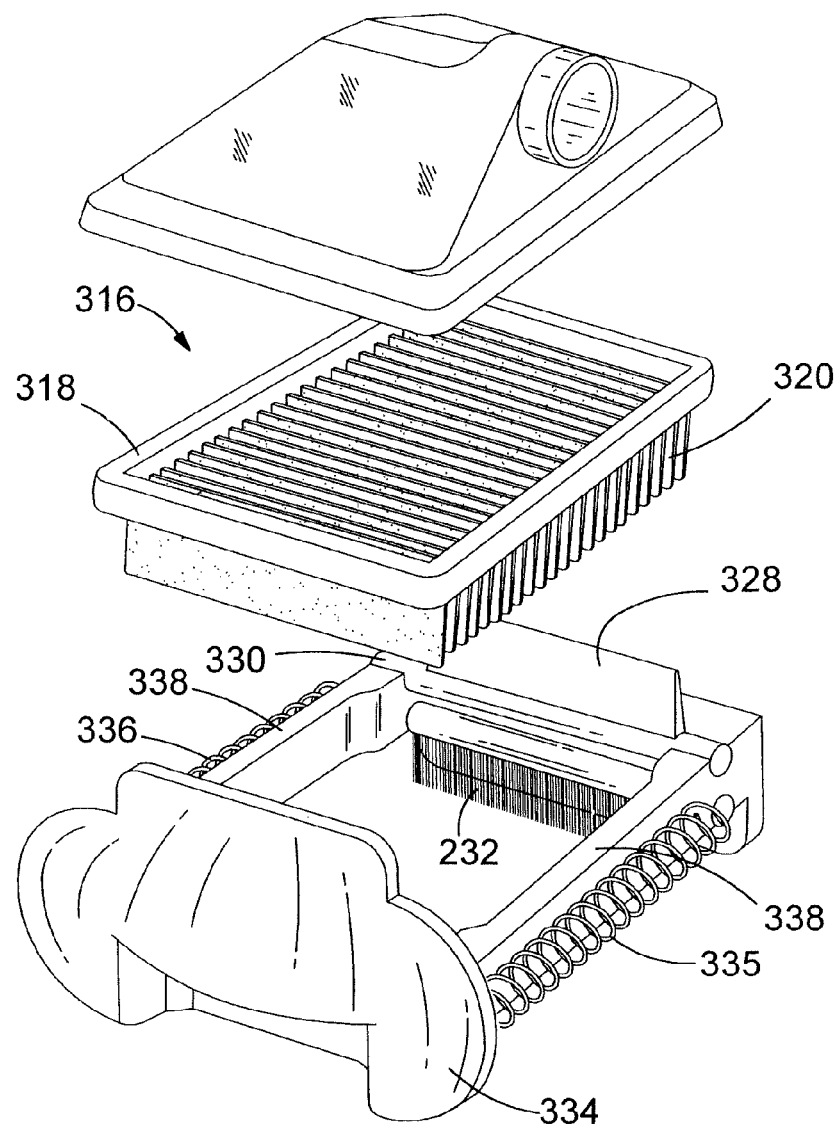

Though FIG. 4 shows the flap 28 moving perpendicularly to the direction of the pleats 320, it will be appreciated by a person skilled in the art that is possible to rotate the filter paper 320 so that the pleats run in parallel to the sliding movement of the flap 328 as shown in FIG. 26. In such a scenario, the rubber flap 28 may be replaced by a plurality of brushes 342.

The construction of the rear handle will now be described with reference to FIGS. 1 and 2.

The body of the power cutter is constructed in the form of a plastic casing constructed from a number of plastic clamshell rigidly connected together. The rear clam shell 430 connects to the rear handle 6. In existing designs of power cutter, the rear handle 6 is integral with the rear clam shell 430. However, if the handle 6 is broken, the whole clam shell 430 needs to be replaced. As handle breakage is common it is desirable to avoid this.

Therefore, the rear handle 6 in the present invention is constructed as a separate item to that of the rear clam shell 430 (or body 2).

The rear handle 6 is constructed from a separate single clam shell 431 which is joined at its top 432 at two points 434 and at its bottom at a single point 436. Each of the three points 434, 436 is joined using a bolt which screws into the plastic clam shell 430. Vibration dampening material may be used in conjunction with the bolts to reduce the amount of vibration transferred to the handle 6 from the body 2. The use of such vibration dampening material allows limited movement of the handle 6 relative to the rear clam 430 at each of the three points. The movement could be either linear or rotational. One such construction is to surround the bolts with the dampening material in order to sandwich it between the bolts and parts of the clam shell of the rear handle 6.

The top 432 of the handle 6 is in the form of a cross bar. The shape is such that the bolts fastening the top 432 of the handle to the rear of the clam shell 430 are aligned with each other and thus provides a pivot axis 440 for the rear handle 6 about which it can rotate by a limited amount.

A person skilled in the art will appreciate that the handle may be constructed from a number of clam shell connect rigidly together. Rubber soft grip over mold 442 may also be added to the handle for additional comfort.

Figure 30:
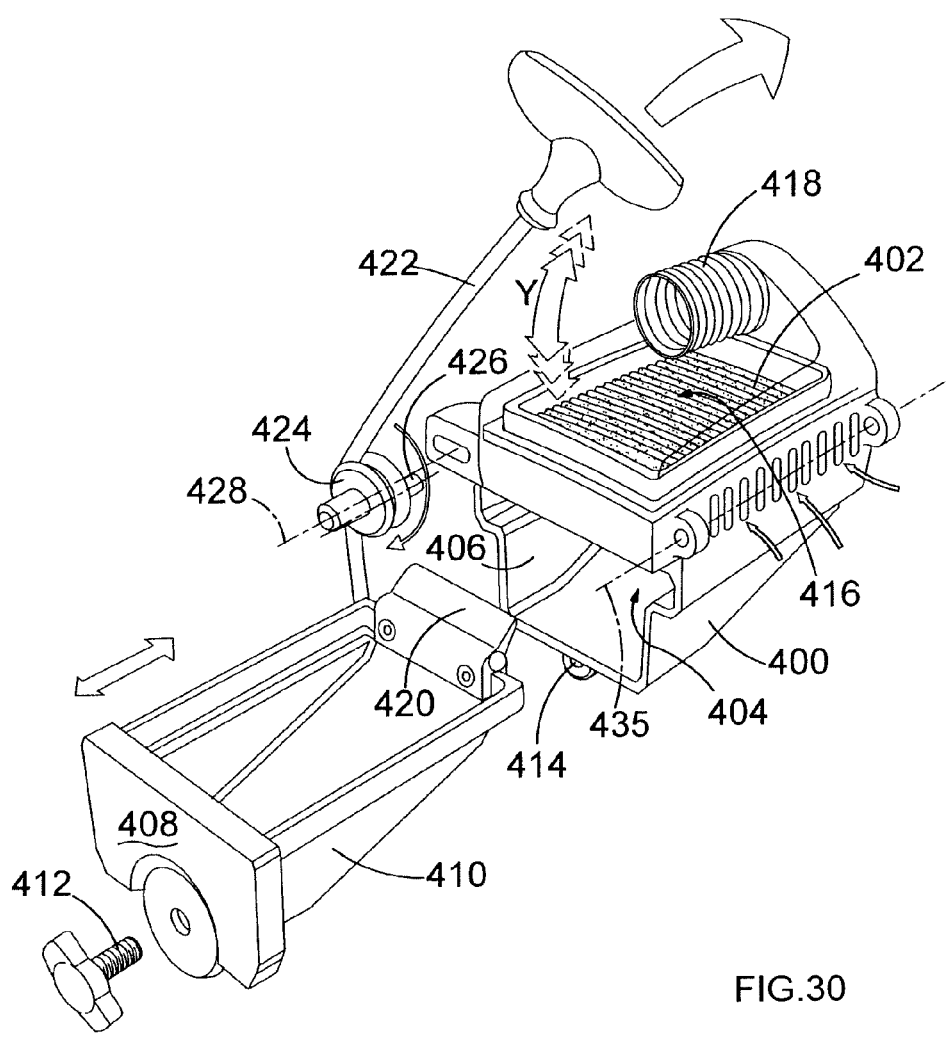
FIG. 30 shows a second embodiment of an air filtration system.

A second embodiment of an air filtration system will now be described with reference to FIG. 30.

The filter device comprises a box 400 in which is mounted filter paper 402 which is pleated and which hangs down from the top section from inside the box. A space 404 is formed below the pleat. A large aperture 406 is formed in the side of the box below the filter paper and through which a drawer 408 can be slid. The drawer comprises a receptacle 410 which locates in the space 404 immediately below the filter paper 402. The drawer 408 can be fastened into place via a screw 412 which threadedly engages a threaded hole 414 in the box. Air passes through slots 314 into the box and into the receptacle 410 in the space 404 below the filter paper 402 then through the filter paper 402 into a space 416 above the filter paper 402 and then exits the space 416 above the filter paper through a flexible tube 418 to the carburetor 126. Any dust contained in the air entering the box 400 is blocked by the filter paper 402.

A combination of two systems have been proposed to shake any dust within the filter paper 402 off the filter paper 402 into the drawer 408 so that the drawer 408 an be removed for emptying.

The first system is very similar to that disclosed in the first embodiment described above and comprises a rubber flap 420 which is attached to the front end of the drawer 408. As the drawer 408 is inserted into the box 400 the rubber flap 420 engages with the pleated filter paper 402. As the drawer 408 slides into the box 400 the rubber flap 420 successively hits the base of each pleat causing any dust on the pleats to be knocked off and into the drawer 408. As such the action of inserting or removing the drawer 408 into the box 400 causes dust on the filter paper 402 to be loosened and allowed to be removed.

The second system relies on the starter cord 422 of the start 12 for the two stroke engine 24 of the power saw. When the engine is started, the power cord 422 needs to be pulled in order to cause it to rotate. As the cord 422 is pulled, it rotates a pulley wheel 424 which causes an eccentric pin 426 to rotate about the axis 428 of the pulley 420. This causes one side of the box 400 to oscillate up and down as indicated by arrows Y. The other side of the box 400 is pivotally attached about an axis 435 to the body of the power cutter. The reciprocating motion of the box 400 causes dust in the filter 402 to be shaken off the filter paper 402 and into the drawer 408.

Each system causes dust trapped in the filter paper 402 to fall into the drawer. When the operator first starts up the power cutter, the action of pulling the starter cord cleans the filter paper 402. Then, the operator can subsequently clean the filter paper during the operation of the power cutter by inserting and removing the drawing 408.

It will be appreciated by a person skilled in the art that the two systems could be used separately, as well as in combination, a power cutter having only one or the other system.

We claim:

1. A power cutter comprising:
   a housing;
   a two stroke internal combustion engine mounted within the housing;
   a throttle switch by which the engine can be accelerated when the engine is running;
   a support arm mounted on the housing and which projects forward of the housing;
   a blade mounting mechanism rotatably mounted on the end of the support arm and which is capable of being rotationally driven by the engine when the engine is running;
   a carburetor for providing aerated fuel for the engine;
   an air intake for providing air for the carburetor;
   an air filtration mechanism to filter the air drawn in from the air intake for the carburetor;
   a fuel tank for providing fuel to the carburetor; and
   an exhaust through which the exhaust gases generated by the operation of the engine are expelled from the engine;
   an engine controller which controls the operation of the engine;
   an oil tank for providing lubricating oil for the engine;
   an oil pump to pump lubricating oil from the oil tank to mix it with fuel; and
   a sensing system which determines whether sufficient lubricating oil is being provided for mixing with the fuel in accordance with predetermined parameters,
   wherein the sensing system provides an indication to the engine controller of when the lubricating oil is not being provided in accordance with the predetermined parameters, the engine controller placing the engine either in an idle mode or switching it off when the sensing system indicates that the lubricating oil is not being provided in accordance with the predetermined parameters.

2. A power cutter as claimed in claim 1, wherein there is provided a passageway between the carburetor and the engine through which the aerated fuel generated by the carburetor passes from the carburetor to the engine, and the oil pump pumps the oil into the passageway to mix with the aerated fuel within the passageway.

3. A power cutter as claimed in claim 2, wherein the lubricating oil is pumped into the passageway in at least one of a liquid form, a spray form and in an atomized form.

4. A power cutter as claimed in claim 3, wherein the oil is pumped into the passageway at a ratio relating to volume of around 1:50 in relation to the amount fuel entering the passageway.

5. A power cutter as claimed in claim 1, wherein, when the engine controller has placed the engine in idle mode because the sensing system has indicated that the lubricating oil is not being provided in accordance with the predetermined parameters, the engine controller prevents an operator from accelerating the engine by the operation of the throttle switch.

6. A power cutter as claimed in claim 1, wherein, when the engine controller has switched the engine off because the sensing system indicates that the lubricating oil is not being provided in accordance with the predetermined parameters, the engine controller prevents an operator from starting the engine again until sufficient oil is detected.

7. A power cutter as claimed in claim 1, wherein the engine comprises:
   at least one spark plug;
   a piston slidably mounted within a cylinder and which is connected to a rotatable crank shaft, the ignition of the spark plug being controlled by the engine controller,
   wherein there is provided a sensor connected to the engine which monitors the angular position of the crank shaft and provides the engine controller with a position signal dependent of the crank shaft angular position, the engine controller using the position to control the ignition of the spark plug to one of placing the engine in the idle mode and switching the engine off.

8. A power cutter as claimed in claim 7, wherein the engine controller alters the timing of the ignition of the spark plug relative to the angular position of the crank shaft to place the engine in idle mode.

9. A power cutter as claimed in claim 7, wherein the engine controller alters the number of ignitions of the spark plug relative to the number of rotations of the crank shaft to place the engine in idle mode.

10. A power cutter as claimed in claim 7, wherein the engine controller stops the engine by stopping the ignition of the spark plug.

11. A power cutter as claimed in claim 1, wherein the sensor system comprises:
   a sensor located in a passageway through which the oil flows, the sensor measuring a parameter of the flow of the lubricating oil in the passageway and generating a signal which is a function of that parameter; and
   a signal processor which processes the signal to determine whether the lubricating oil is being pumped into or through the passageway in accordance with the predetermined parameters and provides an indication to the engine controller when the lubricating oil is not being pumped into the passageway in accordance with the predetermined parameters.

12. A power cutter as claimed 11, wherein the passageway comprises the passageway between the carburetor and the engine through which the aerated fuel generated by the carburetor passes from the carburetor to the engine.

13. A power cutter as claimed in claim 11, wherein the passageway comprises an oil passageway.

14. A power cutter as claimed in claim 11, wherein the signal processor is integral with the sensor.

15. A power cutter as claimed in claim 11, wherein the signal processor forms part of the engine controller.

16. A power cutter as claimed in claim 11, wherein the sensor comprises at least two electrically conductive plates located in the passageway in close proximity to each other wherein the signal is dependent on the change in capacitance of the plates.

17. A power cutter as claimed in claim 11, wherein the parameter comprises the rate of flow of lubricating oil.

18. A power cutter as claimed in claim 1, wherein the oil pump is driven by a crank shaft of the engine.

19. A power cutter as claimed in claim 1, wherein the oil pump is power by an electrical power supply, the sensing system comprising monitoring means which monitors the voltage and/or current of the electrical power supply of the oil pump during the operation of the oil pump and determines whether lubricating oil is being pumped into the passageway by analyzing the values of the voltage and/or current of the electrical power supply to determine whether sufficient lubricating oil is being provided compared with predetermined parameters and providing an indication to the engine controller when the lubricating oil is not being pumped in accordance with the predetermined parameters.

20. A power cutter as claimed in claim 19, wherein the sensing system is incorporated into the engine controller.

* * * * *